United States Patent
Kim

(10) Patent No.: US 9,847,721 B2
(45) Date of Patent: Dec. 19, 2017

(54) DRIVING CIRCUIT, VOLTAGE CONVERTER HAVING ADAPTIVE DEAD TIME CONTROL FUNCTION AND METHOD OF CONTROLLING DEAD TIME

(71) Applicant: Samsung Electronics Co., Ltd., Suwon-Si, Gyeonggi-Do (KR)

(72) Inventor: Je-Kook Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 64 days.

(21) Appl. No.: 14/614,495

(22) Filed: Feb. 5, 2015

(65) Prior Publication Data

US 2015/0357915 A1    Dec. 10, 2015

(30) Foreign Application Priority Data

Jun. 9, 2014  (KR) .................. 10-2014-0069415

(51) Int. Cl.
*H02M 3/158* (2006.01)
*H02M 1/38* (2007.01)

(52) U.S. Cl.
CPC ........... *H02M 3/1588* (2013.01); *H02M 1/38* (2013.01); *Y02B 70/1466* (2013.01)

(58) Field of Classification Search
CPC .... H02M 1/38; H02M 3/1588; Y02B 70/1466
See application file for complete search history.

(56) References Cited

U.S. PATENT DOCUMENTS

| | | | |
|---|---|---|---|
| 6,788,124 B1 | 9/2004 | Kaviani | |
| 7,098,640 B2 | 8/2006 | Brown | |
| 7,391,194 B2 | 6/2008 | Brown | |
| 7,683,594 B2 | 3/2010 | Kim et al. | |
| 7,821,431 B2 | 10/2010 | Prodic et al. | |
| 7,932,703 B2 | 4/2011 | Brohlin et al. | |
| 7,977,994 B2 | 7/2011 | Yousefzadeh et al. | |
| 8,299,770 B2 | 10/2012 | Qiu et al. | |
| 8,368,374 B2 | 2/2013 | Hachiya et al. | |
| 8,436,594 B2 | 5/2013 | Fu et al. | |
| 8,519,747 B2 | 8/2013 | Cho et al. | |
| 8,824,182 B2 * | 9/2014 | Eom ................... | H02M 1/38 323/235 |
| 9,148,078 B2 * | 9/2015 | Hattori .............. | H03K 5/133 |

(Continued)

*Primary Examiner* — Gustavo Rosario Benitez
*Assistant Examiner* — Demetries A Gibson
(74) *Attorney, Agent, or Firm* — Harness, Dickey & Pierce, P.L.C.

(57) ABSTRACT

A voltage converter includes a switching driver, a controller, a low-pass filter and a pulse width modulation signal generator. The switching driver includes a pull-up switching circuit connecting an input voltage to a switching node in response to a pull-up signal and a pull-down switching circuit connecting a ground voltage to the switching node in response to a pull-down signal. The controller generates the pull-up signal and the pull-down signal in response to a pulse width modulation signal and measures pull-up and pull-down turn-on times of the pull-up and pull-down switching circuits in real time to control a dead time. The low-pass filter filters a switching voltage signal on the switching node to generate an output voltage. The pulse width modulation signal generator generates the pulse width modulation signal based on a reference signal and the output voltage.

15 Claims, 21 Drawing Sheets

(56) References Cited

U.S. PATENT DOCUMENTS

| | | | |
|---|---|---|---|
| 9,306,456 B2 * | 4/2016 | Zhang | H02M 3/158 |
| 9,577,525 B2 * | 2/2017 | Biondi | H02M 1/38 |
| 9,712,157 B2 * | 7/2017 | Joos | H03K 17/687 |
| 2006/0152204 A1 * | 7/2006 | Maksimovic | H02M 1/38 |
| | | | 323/284 |
| 2009/0146630 A1 | 6/2009 | Naka | |
| 2010/0270989 A1 * | 10/2010 | Sasaki | H02M 3/157 |
| | | | 323/282 |
| 2011/0227069 A1 * | 9/2011 | Hashimoto | H01L 23/49562 |
| | | | 257/48 |
| 2012/0194141 A1 * | 8/2012 | Shi | H02J 7/0073 |
| | | | 320/137 |
| 2012/0256671 A1 | 10/2012 | Xu et al. | |
| 2013/0015887 A1 | 1/2013 | Piselli et al. | |
| 2013/0063985 A1 | 3/2013 | Ye et al. | |
| 2013/0147458 A1 | 6/2013 | Zhak et al. | |
| 2013/0193938 A1 | 8/2013 | Shook | |
| 2014/0266121 A1 * | 9/2014 | Wee | H02M 3/157 |
| | | | 323/283 |
| 2014/0266481 A1 * | 9/2014 | Shanan | H03B 5/1265 |
| | | | 331/117 FE |
| 2015/0048880 A1 * | 2/2015 | Liu | H03K 5/1252 |
| | | | 327/552 |
| 2015/0097537 A1 * | 4/2015 | Koski | H02M 3/156 |
| | | | 323/271 |
| 2016/0013720 A1 * | 1/2016 | Yamada | H02M 1/38 |
| | | | 323/271 |

* cited by examiner

302

US 9,847,721 B2

DRIVING CIRCUIT, VOLTAGE CONVERTER HAVING ADAPTIVE DEAD TIME CONTROL FUNCTION AND METHOD OF CONTROLLING DEAD TIME

CROSS-REFERENCE TO RELATED APPLICATION

This U.S. Non-provisional application claims priority under 35 USC §119 to Korean Patent Application No. 10-2014-0069415, filed on Jun. 9, 2014, in the Korean Intellectual Property Office (KIPO), the disclosure of which is incorporated by reference in its entirety herein.

BACKGROUND

1. Technical Field

At least one example embodiment relates generally to semiconductor integrated circuits, and more particularly to a driving circuit, a voltage converter having a dead time control function and/or methods of controlling a dead time.

2. Discussion of the Related Art

Semiconductor integrated circuits and electronic devices include a power supply device that converts a voltage from an external source to an internal power supply voltage. In general, the electronic devices include a voltage converter as the power supply device. The electronic devices such as a mobile device require a DC-DC (or DC to DC) converter having small size and high efficiency for providing a stable DC voltage. Recently, DC-DC converters adopt a pulse width modulation scheme to generate a DC output voltage based on a DC input voltage. Such DC-DC converters include a driving circuit of a switching type. A dead time of the driving circuit should be controlled properly to reduce power consumption.

SUMMARY

At least one example embodiment provides a driving circuit and a voltage converter including the driving circuit capable of adaptively controlling a dead time.

At least one example embodiment provides a method of controlling a dead time adaptively.

According to at least one example embodiment, a voltage converter includes a switching driver, a controller, a low-pass filter and a pulse width modulation signal generator. The switching driver includes a pull-up switching circuit configured to connect an input voltage to a switching node in response to a pull-up signal and a pull-down switching circuit configured to connect a ground voltage to the switching node in response to a pull-down signal. The controller generates the pull-up signal and the pull-down signal in response to a pulse width modulation signal and measure a pull-up turn-on time of the pull-up switching circuit and a pull-down turn-on time of the pull-down switching circuit to control a dead time during which both of the pull-up switching circuit and the pull-down switching circuit are turned off. The low-pass filter filters a switching voltage signal on the switching node to generate an output voltage. The pulse width modulation signal generator generates the pulse width modulation signal based on a reference signal and the output voltage.

The controller may delay a falling time point of the pull-up signal by the pull-down turn-on time from a falling time point of the pull-down signal and delay a rising time point of the pull-down signal by the pull-up turn-on time from a rising time point of the pull-up signal.

The controller may compare phases of the switching voltage signal, the pull-up signal and the pull-down signal to measure the pull-up turn-on time and the pull-down turn-on time.

The controller may measure a difference between the falling time point of the pull-up signal and a rising time point of the switching voltage signal as the pull-up turn-on time; and measure a difference between the rising time point of the pull-down signal and a falling time point of the switching voltage signal as the pull-down turn-on time.

The controller may include a detector and a signal generator. The detector may generate a pull-up digital signal and a pull-down digital signal based on the switching voltage signal, the pull-up signal and the pull-down signal, where the pull-up digital signal represents the pull-up turn-on time and the pull-down digital signal represents the pull-down turn-on time. The signal generator may generate the pull-up signal and the pull-down gate signal based on the pulse width modulation signal, the pull-up digital signal and the pull-down digital signal, such that the pull-up signal and the pull-down signal have the dead time corresponding to the pull-up turn-on time and the pull-down turn-on time.

The detector may include a pull-up phase counter configured to compare a phase of the pull-up signal and a phase of the switching voltage signal to generate the pull-up digital signal and a pull-down phase counter configured to compare a phase of the pull-down signal and the phase of the switching voltage signal to generate the pull-down digital signal.

The pull-up phase counter may include an offset delay block configured to delay the switching voltage signal in response to a default digital signal to generate a delayed switching voltage signal, a pull-up delay block configured to delay the pull-up signal in response to the pull-up digital signal to generate a delayed pull-up signal, a counting control unit configured to generate an up-down flag signal based on the delayed switching voltage signal and the delayed pull-up signal and an up-down counter configured to generate the pull-up digital signal based on the up-down flag signal and the pull-up signal.

The counting control unit may include a flip-flop configured to latch the delayed pull-up signal at a rising time point of the delayed switching voltage signal to generate the up-down flag signal.

The up-down counter may perform selectively an up counting or a down counting of rising edges of the pull-up signal to generate the pull-up digital signal.

The pull-down phase counter may include an offset delay block configured to delay the switching voltage signal in response to a default digital signal to generate a delayed switching voltage signal, a pull-down delay block configured to delay the pull-down signal in response to the pull-down digital signal to generate a delayed pull-down signal, a counting control unit configured to generate an up-down flag signal based on the delayed switching voltage signal and the delayed pull-down signal and an up-down counter configured to generate the pull-down digital signal based on the up-down flag signal and the pull-down signal.

The counting control unit may include a flip-flop configured to latch an inversion signal of the delayed pull-down signal at a falling time point of the delayed switching voltage signal to generate the up-down flag signal.

The up-down counter may perform selectively an up counting or a down counting of falling edges of the pull-down signal to generate the pull-down digital signal.

The signal generator may include an offset delay block configured to delay the pulse width modulation signal in response to a default digital signal to generate a delayed offset signal, a pull-up delay block configured to delay the pulse width modulation signal in response to the pull-down digital signal to generate a delayed pull-up signal, a pull-down delay block configured to delay the pulse width modulation signal in response to the pull-up digital signal to generate a delayed pull-down signal, a first logic gate configured to perform an OR logic operation on the delayed offset signal and the delayed pull-up signal to generate the pull-up signal and a second logic gate configured to perform an AND logic operation on the delayed offset signal and the delayed pull-down signal to generate the pull-down signal.

The offset delay block, the pull-up delay block and the pull-down delay block may have same configurations and the default digital signal may be set to a value such that the offset delay block has a minimum delay amount.

Each of the offset delay block, the pull-up delay block and the pull-down delay block may have a plurality of delay units that are coupled in series, and each of the plurality of delay units may have a delay amount that is varied in response of each bit of a digital signal.

The signal generator may include a pull-up delay block configured to delay the pulse width modulation signal in response to the pull-down digital signal to generate a delayed pull-up signal, a pull-down delay block configured to delay the pulse width modulation signal in response to the pull-up digital signal to generate a delayed pull-down signal, a first logic gate configured to perform an OR logic operation on the pulse width modulation signal and the delayed pull-up signal to generate the pull-up signal and a second logic gate configured to perform an AND logic operation on the pulse width modulation signal and the delayed pull-down signal to generate the pull-down signal.

According to at least one example embodiment, a driving circuit includes a switching driver, a detector and a controller. The switching driver includes a pull-up switching circuit configured to connect a first voltage to a switching node in response to a pull-up signal and a pull-down switching circuit configured to connect a second voltage lower than the first voltage to the switching node in response to a pull-down signal. The detector generates a pull-up digital signal and a pull-down digital signal based on the pull-up signal, the pull-down signal and a switching voltage signal on the switching node, where the pull-up digital signal represents a pull-up turn-on time and the pull-down digital signal represents a pull-down turn-on time. The signal generator generates the pull-up signal and the pull-down signal based on an input signal, the pull-up digital signal and the pull-down digital signal, such that the pull-up signal and the pull-down signal have the dead time corresponding to the pull-up turn-on time and the pull-down turn-on time.

The signal generator may delay a falling time point of the pull-up signal by the pull-down turn-on time from a falling time point of the pull-down signal and delay a rising time point of the pull-down signal by the pull-up turn-on time from a rising time point of the pull-up signal.

The detector may include first variable delay blocks configured to measure the pull-up turn-on time and the pull-down turn-on time, the signal generator may include second variable delay blocks configured to control timings of the pull-up signal and the pull-down signal, and the first variable delay blocks and the second delay blocks may have same configurations.

According to at least one example embodiment, a method of controlling a dead time includes measuring a pull-up turn-on time of a pull-up switching circuit that is configured to connect a first voltage to a switching node in response to a pull-up signal, measuring a pull-down turn-on time of a pull-down switching circuit that is configured to connect a second voltage lower than the first voltage to the switching node in response to a pull-down signal, delaying a falling time point of the pull-up signal by the pull-down turn-on time from a falling time point of the pull-down signal and delaying a rising time point of the pull-down signal by the pull-up turn-on time from a rising time point of the pull-up signal.

According to at least one example embodiment, a driving circuit includes a controller. The controller includes a detector configured to measure a first switching delay of a first switching circuit and a second switching delay of a second switching circuit, the first and second switching circuits being connected to a common node. The controller includes a signal generator configured to generate a first signal for driving the first switching circuit and a second signal for driving the second switching circuit based on the measured switching delays and an input signal such that the first switching circuit and the second switching circuit are both turned off for at least one desired time interval during operation of the driving circuit.

The first switching circuit is a pull-up transistor connected between a node having a first voltage and the common node, and the second switching circuit is a pull-down transistor connected between a node having a second voltage and the common node, the second voltage being less than the first voltage.

The detector is configured to measure the switching delays based on fed-back versions of the first and second signals and a fed-back version of an output signal at the common node.

The signal generator is configured to delay a falling edge of the first signal by the second switching delay from a falling edge of the second signal, and delay a rising edge of the second signal by the first switching delay from a rising edge of the first signal.

BRIEF DESCRIPTION OF THE DRAWINGS

Example embodiments will be more clearly understood from the following detailed description taken in conjunction with the accompanying drawings.

DETAILED DESCRIPTION OF EXAMPLE EMBODIMENTS

Figure 1:
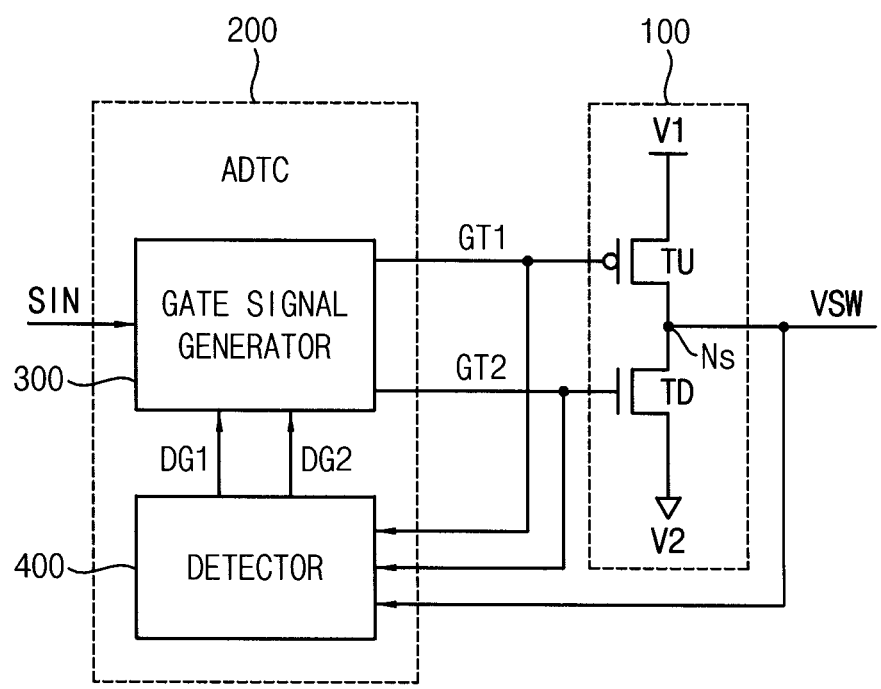
FIG. 1 is a block diagram illustrating a driving circuit according to at least one example embodiment.

Inventive concepts will now be described more fully with reference to the accompanying drawings, in which example embodiments of are shown. These example embodiments are provided so that this disclosure will be thorough and complete, and will fully convey inventive concepts of to those skilled in the art. Inventive concepts may be embodied in many different forms with a variety of modifications, and a few embodiments will be illustrated in drawings and explained in detail. However, this should not be construed as being limited to example embodiments set forth herein, and rather, it should be understood that changes may be made in these example embodiments without departing from the principles and spirit of inventive concepts, the scope of which are defined in the claims and their equivalents. Like numbers refer to like elements throughout. In the drawings, the thicknesses of layers and regions are exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., electronic imaging systems, image processing systems, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASICs), field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible or non-transitory machine readable mediums for storing information. The term "computer-readable medium" may include, but is not limited to, portable or fixed storage devices, optical storage devices, and various other tangible or non-transitory mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "and/or" includes any and all combinations of one or more of the associated listed items. Expressions such as "at least one of," when preceding a list of elements, modify the entire list of elements and do not modify the individual elements of the list.

FIG. 1 is a block diagram illustrating a driving circuit according to at least one example embodiment.

Referring to FIG. 1, a driving circuit 10 includes a switching driver 100 and a controller 200. The controller 200 includes a gate signal generator (or signal generator) 300 and a detector 400. The controller 200 may perform adaptive dead time control (ADTC) according to at least one example embodiment.

The switching driver 100 may include a pull-up transistor (or switching circuit) TU coupled between a first voltage V1 and a switching node Ns and a pull-down transistor (or switching circuit) TD coupled between the switching node Ns and a second voltage V2. The pull-up transistor TU connects the first voltage V1 to the switching node Ns in response to a pull-up gate signal (or pull-up signal) GT1 and the pull-down transistor TD connects the second voltage V2 to the switching node Ns in response to a pull-down gate signal (or pull-down signal) GT2. The second voltage V2 is lower than the first voltage V1. For example, the first voltage V1 may be a power supply voltage and the second voltage V2 may be a ground voltage. It should be understood that the transistors TU and TD are types of switching circuits, and that example embodiments are not limited to the transistors shown in FIG. 1. For example, other types of switching circuits may be used that function the same as or similar to transistors TU and TD.

The detector 400 may generate a pull-up digital signal DG1 and a pull-down digital signal DG2 in real time based on the pull-up gate signal GT1, the pull-down gate signal GT2 and a switching voltage signal VSW on the switching node Ns. The pull-up digital signal DG1 represents a pull-up turn-on time TON1 and the pull-down digital signal DG2 represents a pull-down turn-on time TON2.

The gate signal generator 300 may generate the pull-up gate signal GT1 and the pull-down gate signal GT2 based on an input signal SIN, the pull-up digital signal DG1 and the pull-down digital signal DG2. As described below, the pull-up gate signal GT1 and the pull-down gate signal GT2 have the dead time corresponding to the pull-up turn-on time TON1 and the pull-down turn-on time TON2.

In the driving circuit 10 of the switching type using the pull-up transistor TU and the pull-down transistor TD and the voltage converter including the driving circuit 10, power consumption may be increased significantly due to a short current if the pull-up transistor TU and the pull-down transistor TD are turned on simultaneously. Accordingly, a certain dead time should be set after one of the transistors TU and TD is turned off and before the other of the transistors TU and TD is turned on. The dead time may be defined as a time or a time interval during which both of the transistors TU and TD are turned off. In other words, the dead time may be represented as a time while the pull-up gate signal GT1 has a logic high level and simultaneously the pull-down gate signal GT2 has a logic low level.

Conventionally, a sufficiently-large dead time is set to cover all fluctuation of the operational voltage, the operational temperature, the manufacturing processes, etc. A simulation is performed under the worst conditions to estimate a required dead time, a margin is further added to the estimated dead time, and then a fixed dead margin is determined. Such a fixed dead time of the conventional scheme degrades efficiency because it does not reflect variability of the operational conditions.

However, according to at least one example embodiment, the turn-on times (or switching delays) of the transistors (or switching circuits) are measured in real-time to reflect variability of the operational conditions such as the operational voltage, the operational temperature, the manufacturing processes, etc., thereby enhancing power efficiency and performance of a driving circuit, a voltage converter and devices including the driving circuit.

Figure 2:
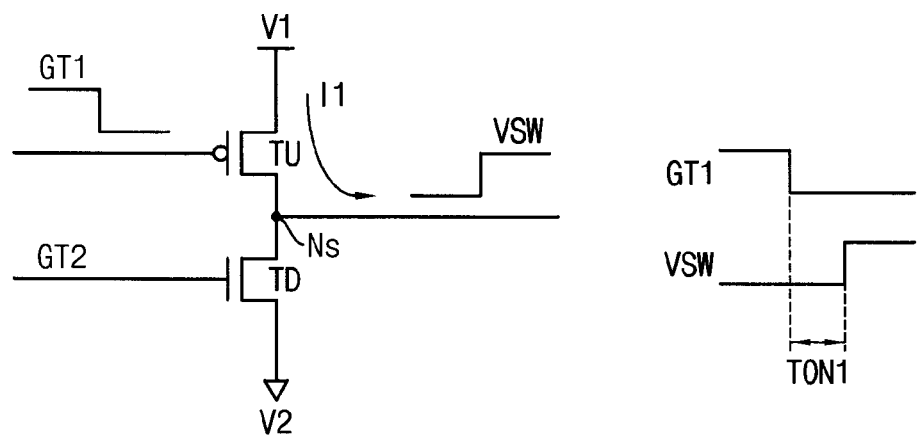
FIGS. 2 and 3 are diagrams for describing a method of measuring turn-on times according to at least one example embodiment.
Figure 3:
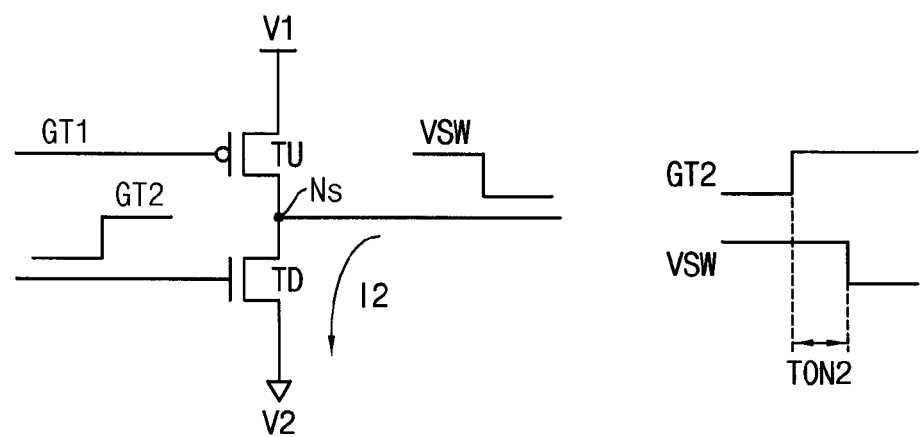

FIGS. 2 and 3 are diagrams for describing a method of measuring turn-on times according to at least one example embodiment.

Referring to FIG. 2, when the pull-up gate signal GT1 is activated from logic high level to logic low level, a channel is formed in the pull-up transistor TU and the first voltage V1 is connected to the switching node Ns. The switching voltage signal VSW on the switching node Ns transitions from a low voltage level to a high voltage level by a sourcing current I1. The high voltage level may be substantially the same as the first voltage V1 and the low voltage level may be substantially the same as the second voltage V2. A time difference between a falling time point (or falling edge) of the pull-up gate signal GT1 and a rising time point (or rising edge) of the switching voltage signal VSW may be measured as the pull-up turn-on time (or switching delay) TON1.

Referring to FIG. 3, when the pull-down gate signal GT2 is activated from logic low level to logic high level, a channel is formed in the pull-down transistor TD and the second voltage V2 is connected to the switching node Ns. The switching voltage signal VSW on the switching node Ns transitions from the high voltage level to the low voltage level by a sinking current I2. A time difference between a rising time point (or rising edge) of the pull-down gate signal GT2 and a falling time point (or falling edge) of the switching voltage signal VSW may be measured as the pull-down turn-on time (or switching delay) TON2.

In view of the above description, it should be appreciated that the pull-up turn-on time TON1 and the pull-down turn-on time TON2 may be measured by comparing phases of the switching voltage signal VSW, the pull-up gate signal GT1 and the pull-down gate signal GT2.

Figure 4:
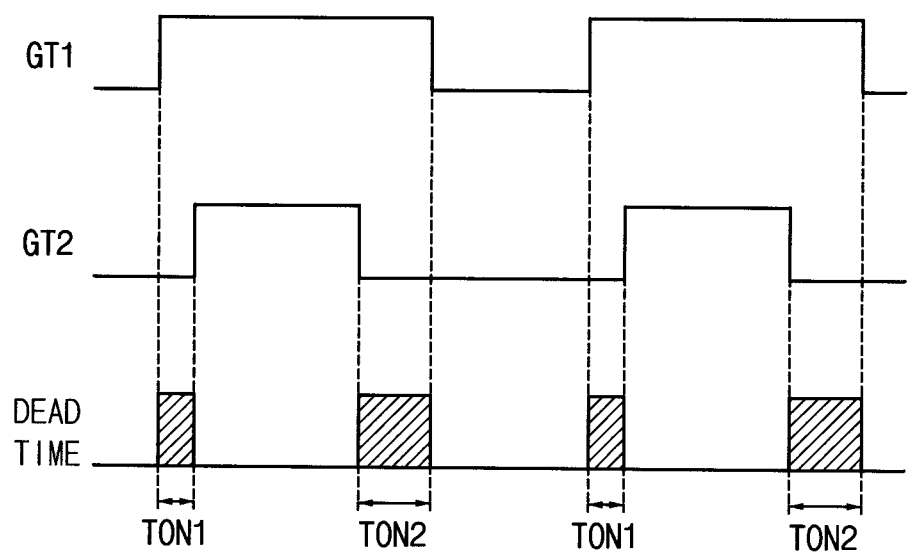
FIG. 4 is a timing diagram illustrating a method of setting a dead time according to at least one example embodiment.

FIG. 4 is a timing diagram illustrating a method of setting a dead time according to at least one example embodiment.

Referring to FIG. 4, a dead time may be set as the measured pull-up turn-on time (or first switching delay) TON1 and the measured pull-down turn-on time TON2 (or second switching delay).

The falling time point of the pull-up gate signal GT1 may be delayed by the pull-down turn-on time TON2 from the falling time point of the pull-down gate signal GT2. Thus, the pull-up transistor TU may begin to be turned on by the delay of the pull-down turn-on time TON2 after the pull-down transistor TD begins to be turned off.

The rising time point of the pull-down gate signal GT2 may be delayed by the pull-up turn-on time TON1 from the rising time point of the pull-up gate signal GT1. Thus, the pull-down transistor TD may begin to be turned on by the delay of the pull-up turn-on time TON1 after the pull-up transistor TU begins to be turned off.

The turn-off times of the pull-up transistor TU and the pull-down transistor TD may be measured to set the dead time. It is difficult, however, to measure the turn-off times in real time. A turn-on time and a turn-off time of a transistor depend on mobility of charge carriers such as electrons and holes for forming a channel, and thus the turn-off time and the turn-on time may be considered as being substantially the same. However, as described with reference FIGS. 2 and 3, the pull-up turn-on time TON1 and the pull-down turn-on time TON2 may be measured conveniently by comparing the phases of the switching voltage signal VSW, the pull-up gate signal GT1 and the pull-down gate signal GT2, and the dead time may be set efficiently using the measured turn-on times TON1 and TON2.

Figure 5:
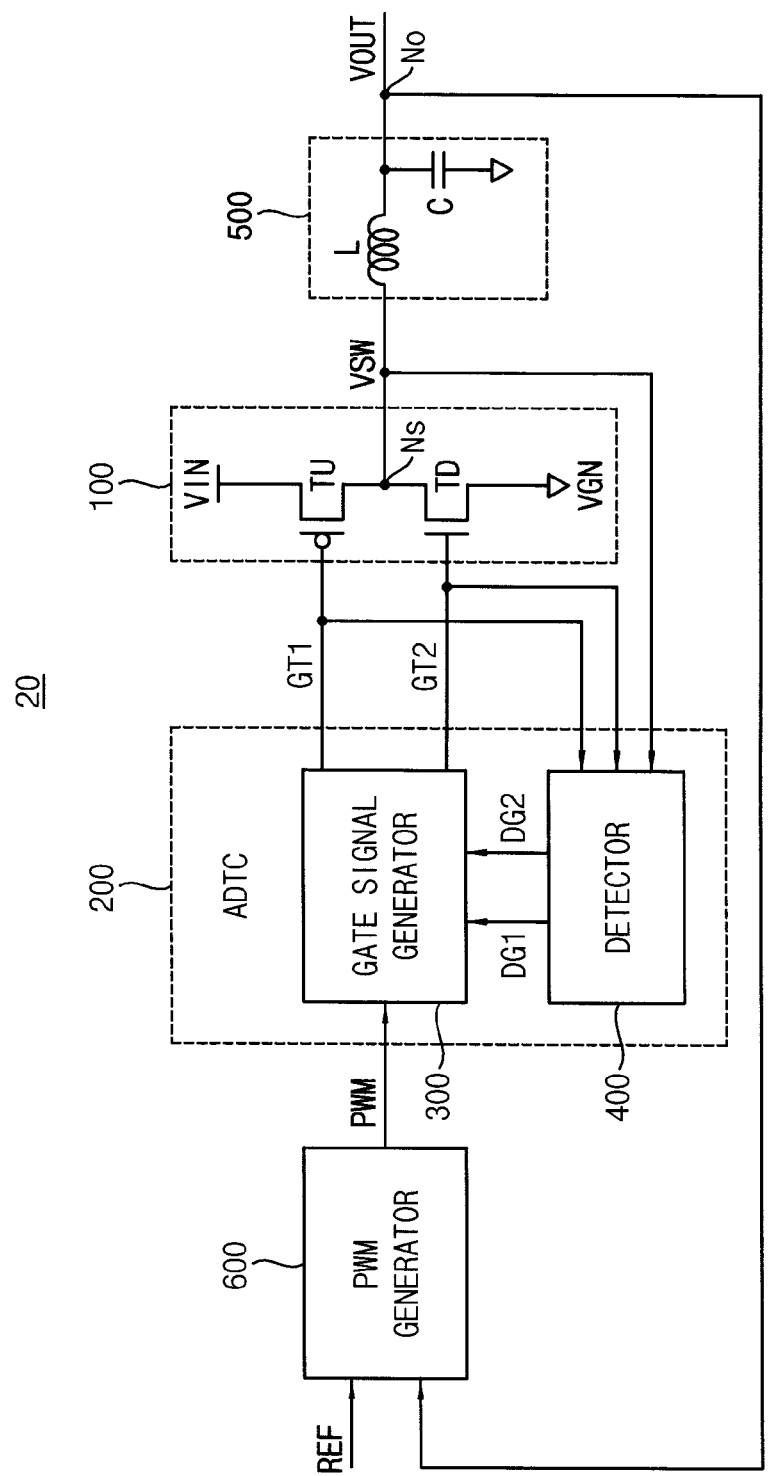
FIG. 5 is a block diagram illustrating a voltage converter according to at least one example embodiment.
Figure 6:
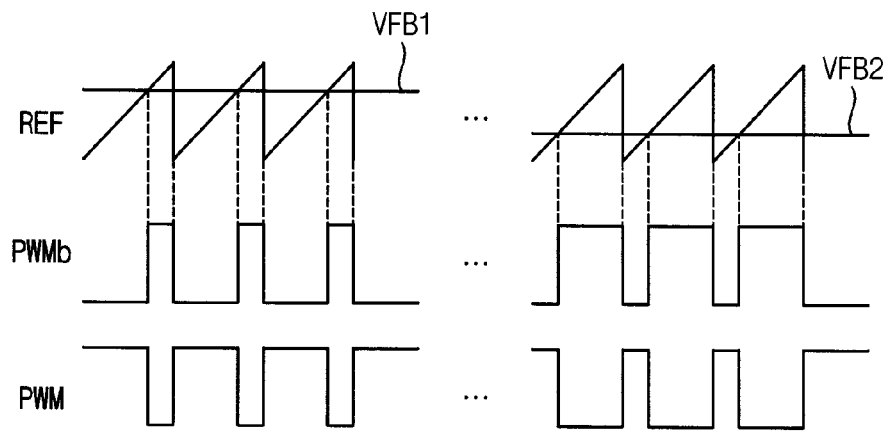
FIG. 6 is a timing diagram illustrating an example of generating a pulse width modulation signal.

FIG. 5 is a block diagram illustrating a voltage converter according to at least one example embodiment, and FIG. 6 is a timing diagram illustrating an example of generating a pulse width modulation signal.

A voltage converter may stabilize an input voltage to generate a stabilized output voltage. Both of the input voltage and the output voltage may be DC voltages and then the voltage converter may be referred to as a DC-DC converter. Hereinafter, example embodiments are described referring to a DC-DC converter adopting pulse width modulation as illustrated in FIG. 5.

Referring to FIG. 5, a voltage converter 20 may include a switching driver 100, a controller 200, a low-pass filter 500 and a pulse width modulation signal generator 600.

The switching driver 100 may include a pull-up transistor TU coupled between an input voltage VIN and a switching node Ns and a pull-down transistor TD coupled between the switching node Ns and a ground voltage VGN. The pull-up transistor TU connects the input voltage VIN to the switching node Ns in response to a pull-up gate signal GT1 and the pull-down transistor TD connects the ground voltage VGN to the switching node Ns in response to a pull-down gate signal GT2.

The controller 200 may generate the pull-up gate signal GT1 and the pull-down gate signal GT2 in response to a pulse width modulation signal PWM. The controller 200 may measure the pull-up turn-on time TON1 of the pull-up transistor TU and the pull-down turn-on time TON2 of the pull-down transistor TD in real time to control a dead time during which both of the pull-up transistor TU and the pull-down transistor TD are turned off.

As described with reference to FIG. 1, the controller 200 includes a gate signal generator 300 and a detector 400. The controller 200 has a configuration to perform adaptive dead time control (ADTC) according to at least one example embodiment.

The detector 400 may generate a pull-up digital signal DG1 and a pull-down digital signal DG2 in real time based on the pull-up gate signal GT1, the pull-down gate signal GT2 and a switching voltage signal VSW on the switching node Ns. The phrase "in real time" is used to emphasize that the signals GT1, GT2, VSW of a current stage are being fed back into the detector 400 so as to generate updated signals in a next stage. Thus, it should be understood that the detector 400 may detect fed-back versions of signals GT1, GT2, and VSW. The pull-up digital signal DG1 represents the pull-up turn-on time TON1 and the pull-down digital signal DG2 represents the pull-down turn-on time TON2.

The gate signal generator 300 may generate the pull-up gate signal GT1 and the pull-down gate signal GT2 based on the pulse width modulation signal PWM, the pull-up digital signal DG1 and the pull-down digital signal DG2. As described below with reference to FIG. 4, the pull-up gate signal GT1 and the pull-down gate signal GT2 have the dead time corresponding to the pull-up turn-on time TON1 and the pull-down turn-on time TON2.

The low-pass filter 500 may filter the switching voltage signal VSW on the switching node Ns to generate an output voltage VOUT on an output node "No." FIG. 5 illustrates a non-limiting example embodiment of the low-pass filter 500 including one inductor L and one capacitor C. It should be appreciated that the configuration of the low-pass filter 500 may be changed variously.

The pulse width modulation signal generator 600 may generate the pulse width modulation signal PWM based on a reference signal REF and the output voltage VOUT. As illustrated in FIG. 6, the reference signal REF may have a regular sawtooth waveform. The feedback voltage VFB in FIG. 6 may be the output voltage VOUT or a divided voltage from the output voltage VOUT. The duty ratio of the pulse width modulation signal PWM may increase as the feedback voltage VFB decreases and the duty ratio of the pulse width modulation signal PWM may decrease as the feedback voltage VFB increases. If the duty ratio of the pulse width modulation signal PWM increases, the turned-on time of the pull-up transistor TU decreases, the turned-on time of the pull-down transistor TD increases and thus the output voltage VOUT decreases. In contrast, if the duty ratio of the pulse width modulation signal PWM decreases, the turned-on time of the pull-up transistor TU increases, the turned-on time of the pull-down transistor TD decreases and thus the output voltage VOUT increases. Through such feedback operations, the stable output voltage VOUT may be provided.

In case of the switched voltage converter 20 using the pulse width modulation signal PWM, power consumption may be increased significantly due to a short current if the pull-up transistor TU and the pull-down transistor TD are turned on simultaneously. Accordingly, a certain dead time has to be set after one of the transistors TU and TD is turned off and before the other of the transistors TU and TD is turned on, to reduce the occurrence of (or alternatively, prevent) the short current. The dead time may be defined as a time or a time interval while both of the transistors TU and TD are turned off. In other words, the dead time may be represented as a time while the pull-up gate signal GT1 has logic high level and simultaneously the pull-down gate signal GT2 has logic low level.

In conventional schemes, a sufficiently-large dead time is set to cover all fluctuation of the operational voltage, the operational temperature, the manufacturing processes, etc. A simulation is performed under the worst conditions to estimate a required dead time, a margin is further added to the estimated dead time, and then a fixed dead margin is determined. Such a fixed dead time of the conventional scheme degrades efficiency because it does not reflect variability of the operational conditions.

According to at least one example embodiment, the turn-on times of the transistors are measured in real-time to reflect variability of the operational conditions such as the operational voltage, the operational temperature, the manufacturing processes, etc., thereby enhancing power efficiency and performance of a driving circuit, a voltage converter and devices including the driving circuit.

Figure 7:
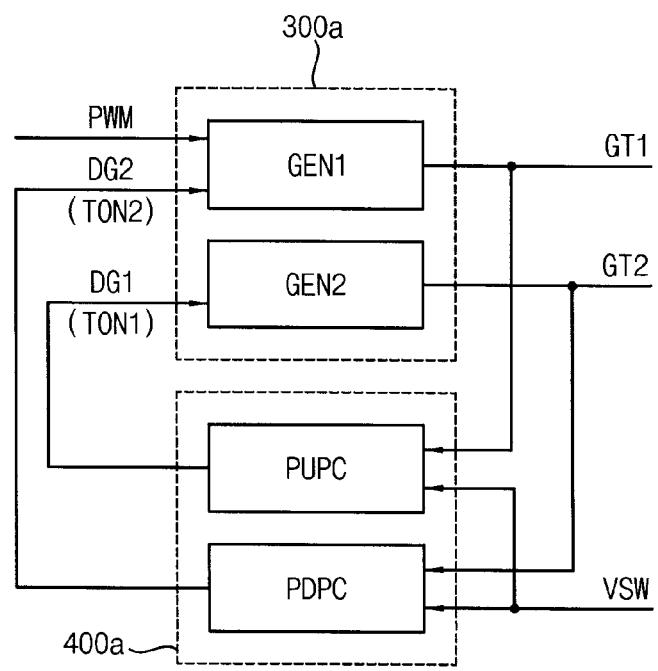
FIG. 7 is a block diagram illustrating an example embodiment of a controller included in the voltage converter of FIG. 5.

FIG. 7 is a block diagram illustrating an example embodiment of a controller included in the voltage converter of FIG. 5.

Referring to FIG. 7, a controller 200a includes a gate signal generator 300a and a detector 400a. The detector 400a may generate the pull-up digital signal DG1 and the pull-down digital signal DG2 in real time based on the pull-up gate signal GT1, the pull-down gate signal GT2, and the switching voltage signal VSW. The pull-up digital signal DG1 represents the pull-up turn-on time TON1 and the pull-down digital signal DG2 represents the pull-down turn-on time TON2. The gate signal generator 300a may generate the pull-up gate signal GT1 and the pull-down gate signal GT2 based on the pulse width modulation signal PWM, the pull-up digital signal DG1, and the pull-down digital signal DG2, such that the pull-up gate signal GT1 and the pull-down gate signal GT2 have the dead time corresponding to the pull-up turn-on time TON1 and the pull-down turn-on time TON2.

The gate signal generator 300a may include a pull-up gate signal generator GEN1 for generating the pull-up gate signal GT1 and a pull-down gate signal generator GEN2 for generating the pull-down gate signal GT2. The detector 400a may include a pull-up phase counter PUPC for generating the pull-up digital signal DG1 and a pull-down phase counter PDPC for generating the pull-down digital signal DG2. The pull-up phase counter PUPC may compare a phase of the pull-up gate signal GT1 and a phase of the switching voltage signal VSW to generate the pull-up digital signal DG1, and the pull-down phase counter PDPC may compare a phase of the pull-down gate signal GT2 and the phase of the switching voltage signal VSW to generate the pull-down digital signal DG2.

As illustrated in FIG. 7, the pull-up gate signal generator GEN1 may generate the pull-up gate signal GT1 based on the pull-down digital signal DG2 representing the pull-down turn-on time TON2, and the pull-down gate signal generator GEN2 may generate the pull-down gate signal GT2 based on the pull-up digital signal DG1 representing the pull-up turn-on time TON1. To set the dead time as described with reference to FIG. 4, the pull-up gate signal generator GEN1 may delay the falling time point of the pull-up gate signal GT1 by the pull-down turn-on time TON2 from the falling time point of the pull-down gate signal GT2 based on the pull-down digital signal DG2, and the pull-down gate signal generator GEN2 may delay the rising time point of the pull-down gate signal GT2 by the pull-up turn-on time TON1 from the rising time point of the pull-up gate signal GT1 based on the pull-up digital signal DG1.

As will be described with reference to FIGS. 14 through 20, the detector 400a may include variable delay blocks for measuring the pull-up turn-on time TON1 and the pull-down turn-on time TON1. In addition, as will be described with reference to FIGS. 8 through 13, the gate signal generator 300a may include variable delay blocks for controlling timings of the pull-up gate signal GT1 and the pull-down gate signal GT2. The variable delay blocks of the detector 400a and the variable delay blocks of the gate signal generator 300a may have the same configurations so that the delay blocks have the same delay characteristics.

Figure 8:
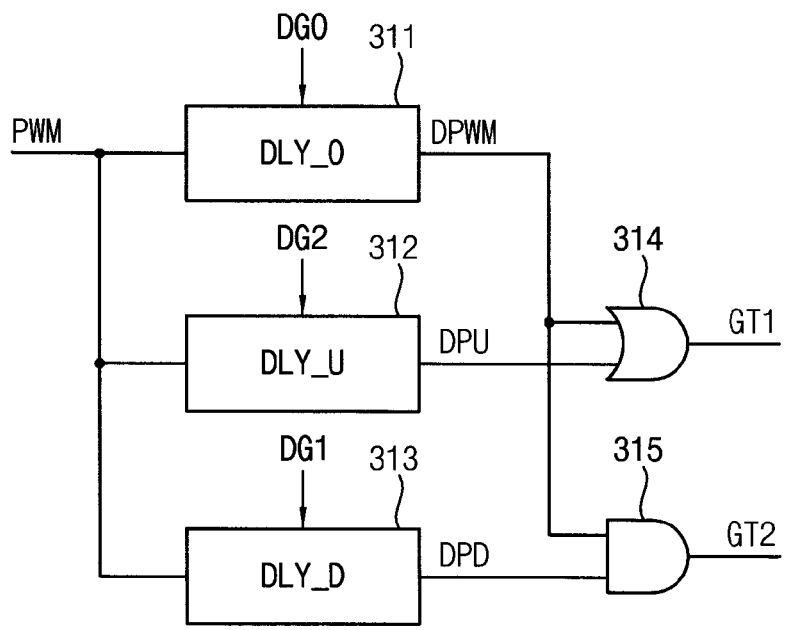
FIG. 8 is a diagram illustrating an example embodiment of a gate signal generator included in the controller of FIG. 7.

FIG. 8 is a diagram illustrating an example embodiment of a gate signal generator included in the controller of FIG. 7.

Referring to FIG. 8, a gate signal generator 301 may include an offset delay block DLY_O 311, a pull-up delay block DLY_U 312, a pull-down delay block DLY_D 313, an OR logic gate 314 and an AND logic gate 315.

The offset delay block 311 may delay the pulse width modulation signal PWM in response to a default digital signal DG0 to generate a delayed offset signal DPWM. The pull-up delay block 312 may delay the pulse width modulation signal PWM in response to the pull-down digital signal DG2 to generate a delayed pull-up signal DPU. The pull-down delay block 313 may delay the pulse width modulation signal PWM in response to the pull-up digital signal DG1 to generate a delayed pull-down signal DPD. The OR logic gate 314 may perform an OR logic operation on the delayed offset signal DPWM and the delayed pull-up signal DPU to generate the pull-up gate signal GT1. The AND logic gate 315 may perform an AND logic operation on the delayed offset signal DPWM and the delayed pull-down signal DPD to generate the pull-down gate signal GT2.

Figure 9:
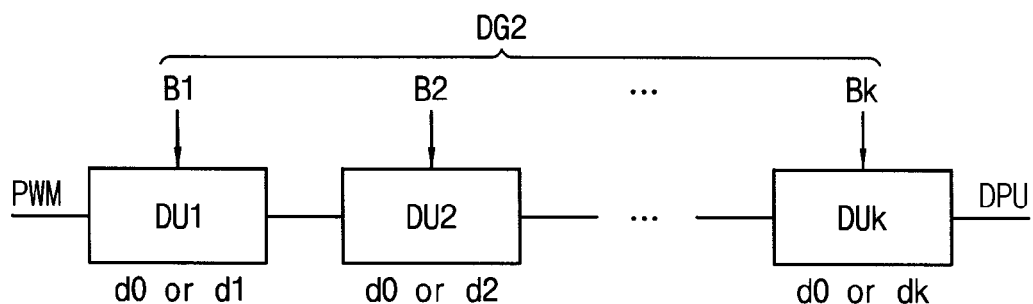
FIG. 9 is a diagram illustrating an example embodiment of a digital variable delay block included in the gate signal generator of FIG. 8.
Figure 10:
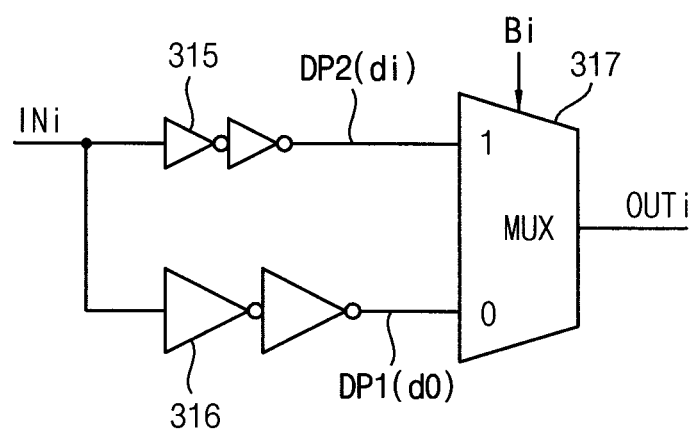
FIG. 10 is a diagram illustrating an example embodiment of a delay unit included in the digital variable delay block of FIG. 9.

FIG. 9 is a diagram illustrating an example embodiment of a digital variable delay block included in the gate signal generator of FIG. 8, and FIG. 10 is a diagram illustrating an example embodiment of a delay unit included in the digital variable delay block of FIG. 9.

For convenience of illustration, only the pull-up delay block 312, which delays the pulse width signal PWM by the pull-down turn-on time TON2 in response to the pull-down digital signal DG2 to generate the delayed pull-up signal DPU, is illustrated in FIG. 9. The offset delay block 311 and the pull-down delay block 313 may have the same configurations as the pull-up delay block 312 of FIG. 9, but they have the different delay amounts depending on the received digital signals DG0, DG1 and DG2.

Referring to FIG. 9, the pull-up delay block 312 may include a plurality of delay units DU1 through DUk that are coupled in series, and each of the plurality of delay units DU1 through DUk may have a delay amount that is varied in response each of bits B1 through Bk of a digital signal DG2. Referring to FIG. 10, each delay unit DUi (i=1, 2, ..., k) may include two delay paths DP1 and DP2 having different delay amounts d0 and di and a multiplexer MUX 317. The first delay path DP1 has a first delay amount d0 and the second delay path DP2 has a second delay amount di greater than the first delay amount d0. The delay amounts d0 and di may be determined by adjusting, for example, sizes of the inverters 315 and 316 disposed on the delay paths DP1 and DP2. If each bit Bi of the digital signal DG2 has a value of '1', the output signal OUTi may be delayed by the second delay amount di from the input signal INi. If each bit Bi of the digital signal DG2 has a value of '0', the output signal OUTi may be delayed by the first delay amount d0 from the input signal INi.

For example, the pull-up delay block 312 may include first through fourth delay units DU1 through DU4 and the pull-down digital signal DG2 may have four bits B1 through B4. The first delay amounts d0 of the first through fourth delay units DU1 through DU4 may be set to be equal to each other, and the second delay amounts d1 through d4 may be set differently, for example, 200 ps (picoseconds), 400 ps, 800 ps and 1600 ps, respectively. In this case, if the minimum delay amount or the offset delay amount corresponding to 4*d0 is neglected, the total delay amount of the delayed pull-up signal DPU may be adjusted between 0 and 3 ns (nanoseconds) by unit of 200 ps. The default digital signal DG0 in FIG. 8 may be set to '0000' so that the offset delay block 311 has the minimum delay amount 4*d0.

Figure 11:
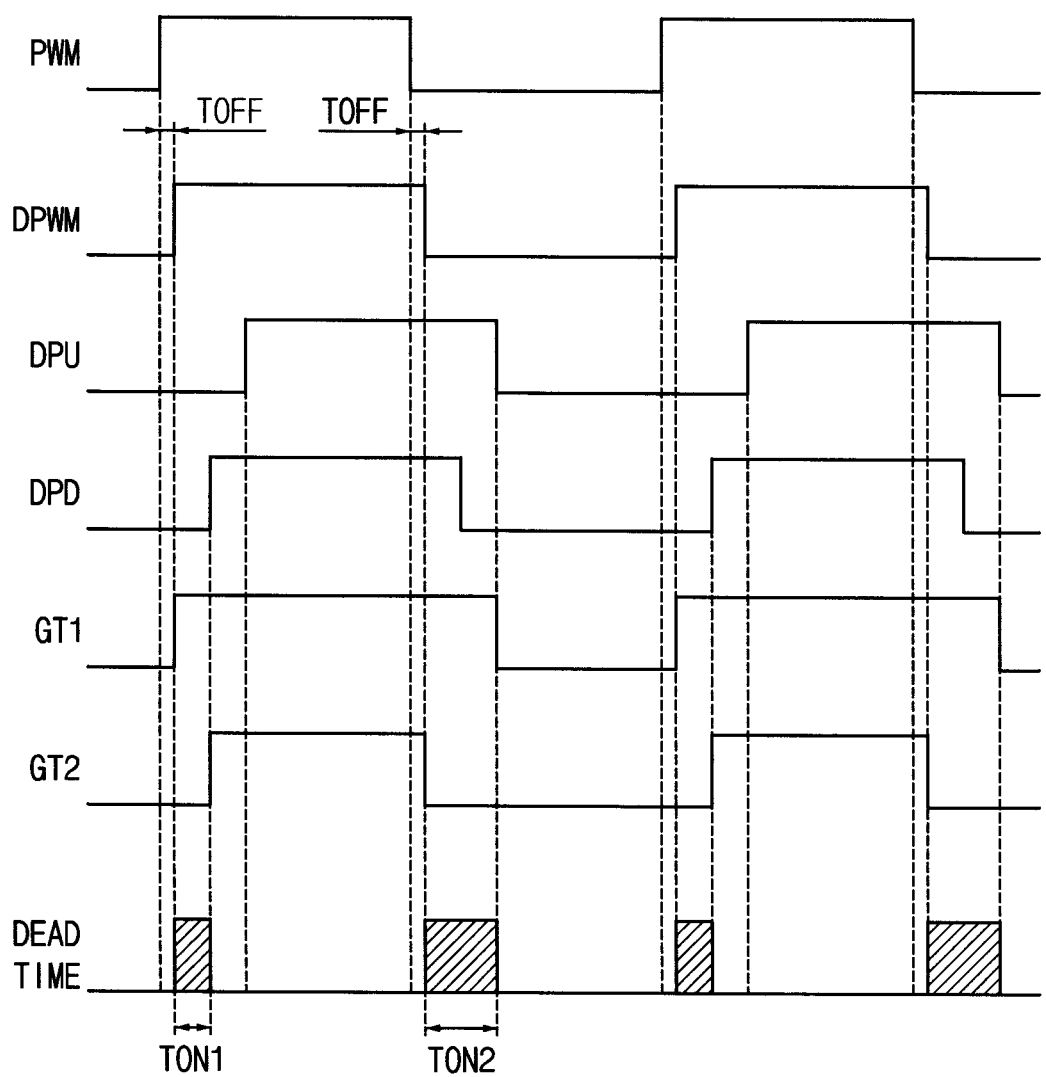
FIG. 11 is a timing diagram illustrating operations of the gate signal generator of FIG. 8.

FIG. 11 is a timing diagram illustrating operations of the gate signal generator of FIG. 8.

Referring to FIGS. 8 and 11, the offset delay block 311 may delay the pulse width modulation signal PWM by the offset amount TOFF in response to the default digital signal DG0 to generate the delayed offset signal DPWM. The pull-up delay block 312 may delay the pulse width modulation signal PWM in response to the pull-down digital signal DG2 to generate the delayed pull-up signal DPU. The pull-down delay block 313 may delay the pulse width modulation signal PWM in response to the pull-up digital signal DG1 to generate the delayed pull-down signal DPD. The OR logic gate 314 may perform an OR logic operation on the delayed offset signal DPWM and the delayed pull-up signal DPU to generate the pull-up gate signal GT1. The AND logic gate 315 may perform an AND logic operation on the delayed offset signal DPWM and the delayed pull-down signal DPD to generate the pull-down gate signal GT2.

As a result, the falling time point of the pull-up gate signal GT1 may be delayed by the pull-down turn-on time TON2 from the falling time point of the pull-down gate signal GT2, the rising time point of the pull-down gate signal GT2 may be delayed by the pull-up turn-on time TON1 from the rising time point of the pull-up gate signal GT1, and thus the dead time may be controlled adaptively.

Figure 12:
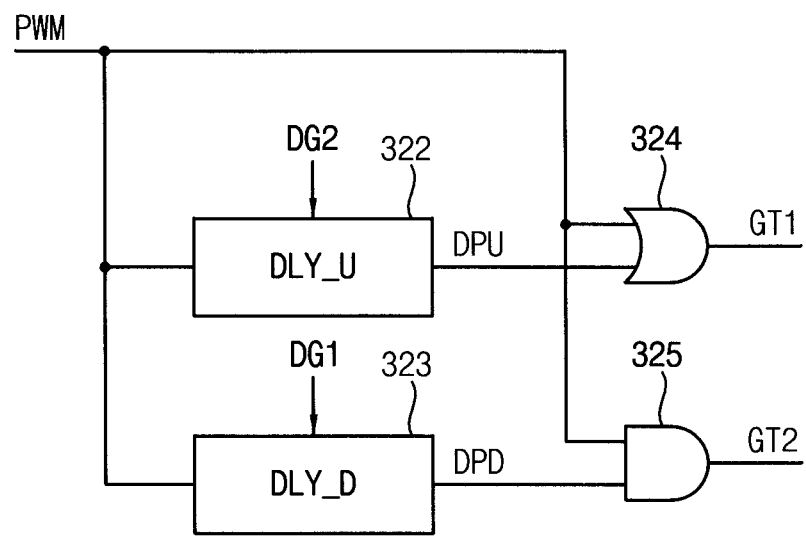
FIG. 12 is a diagram illustrating an example embodiment of a gate signal generator included in the controller of FIG. 7.
Figure 13:
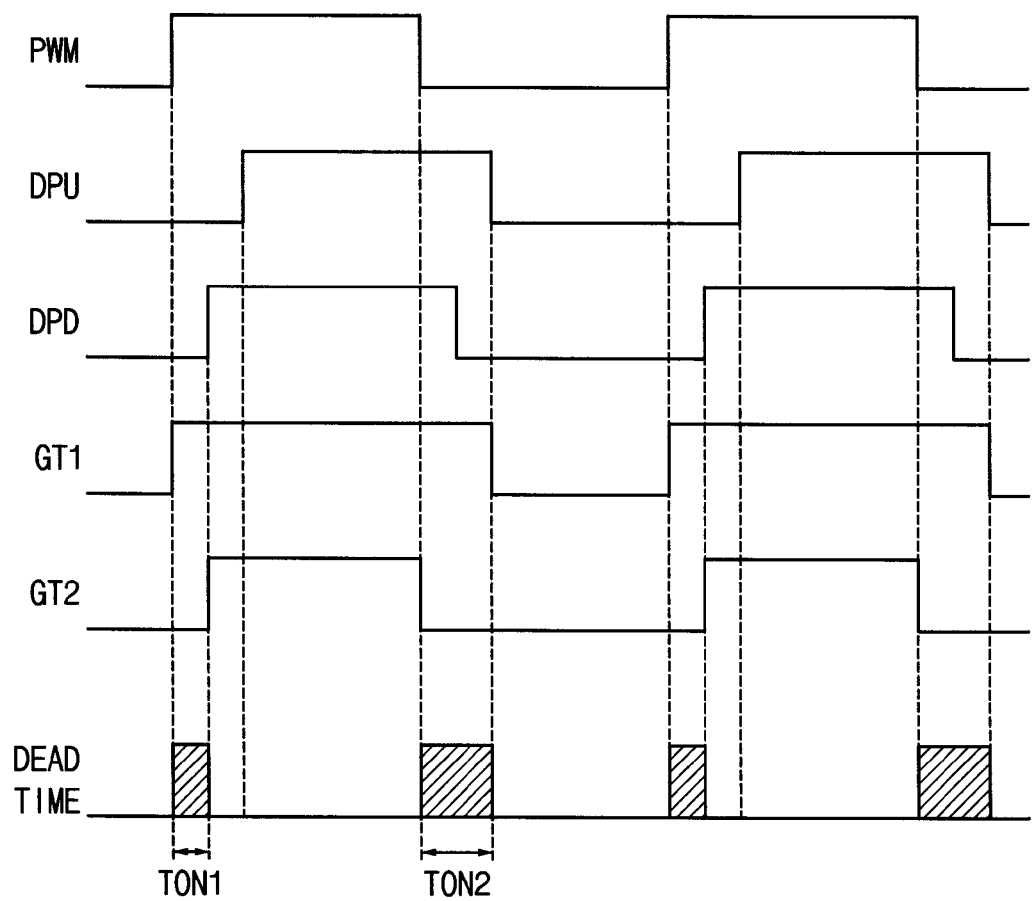
FIG. 13 is a timing diagram illustrating operations of the gate signal generator of FIG. 12.

FIG. 12 is a diagram illustrating an example embodiment of a gate signal generator included in the controller of FIG. 7, and FIG. 13 is a timing diagram illustrating operations of the gate signal generator of FIG. 12.

Referring to FIG. 12, a gate signal generator 302 may include a pull-up delay block DLY_U 322, a pull-down delay block DLY_D 323, an OR logic gate 324 and an AND logic gate 325. Compared with the gate signal generator 301 of FIG. 8, the offset delay block DLY_O 311 is omitted in the gate signal generator 302 of FIG. 12.

Referring to FIGS. 12 and 13, the pull-up delay block 322 may delay the pulse width modulation signal PWM in response to the pull-down digital signal DG2 to generate the delayed pull-up signal DPU. The pull-down delay block 323 may delay the pulse width modulation signal PWM in response to the pull-up digital signal DG1 to generate the delayed pull-down signal DPD. The OR logic gate 314 may perform an OR logic operation on the pulse width modulation signal PWM and the delayed pull-up signal DPU to generate the pull-up gate signal GT1. The AND logic gate 315 may perform an AND logic operation on the pulse width modulation signal PWM and the delayed pull-down signal DPD to generate the pull-down gate signal GT2.

As a result, the falling time point of the pull-up gate signal GT1 may be delayed by the pull-down turn-on time TON2 from the falling time point of the pull-down gate signal GT2, the rising time point of the pull-down gate signal GT2 may be delayed by the pull-up turn-on time TON1 from the rising time point of the pull-up gate signal GT1, and thus the dead time may be controlled adaptively.

Figure 14:
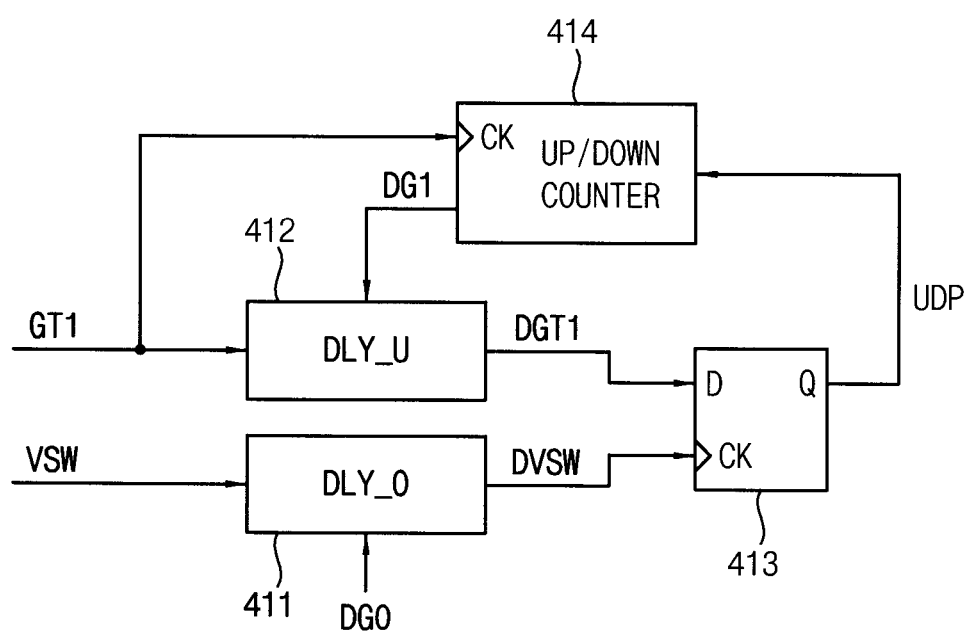
FIG. 14 is a block diagram illustrating an example embodiment of a pull-up phase counter included in the controller of FIG. 7.

FIG. 14 is a block diagram illustrating an example embodiment of a pull-up phase counter included in the controller of FIG. 7.

Referring to FIG. 14, a pull-up phase counter 401 may include an offset delay block DLY_O 411, a pull-up delay block DLY_U 412, a counting control unit 413 and an up-down counter 414.

The offset delay block 411 may delay the switching voltage signal VSW in response to a default digital signal DG0 to generate a delayed switching voltage signal DVSW. The pull-up delay block 412 may delay the pull-up gate signal GT1 in response to the pull-up digital signal DG1 to generate a delayed pull-up gate signal DGT1. The counting control unit 413 may generate an up-down flag signal UDP based on the delayed switching voltage signal DVSW and the delayed pull-up gate signal DGT1. The up-down counter 414 may generate the pull-up digital signal DG1 based on the up-down flag signal UDP and the pull-up gate signal GT1.

The offset delay block 411 and the pull-up delay block 412 may be implemented with the variable delay line as described with reference to FIGS. 9 and 10. As described above, the default digital signal DG0 provided to the offset delay block 411 may be set such that the offset delay block 411 have the minimum delay amount. In at least one other example embodiment, the offset delay block 411 may be omitted and the counting control unit 413 may receive the switching voltage signal VSW directly.

Figure 15:
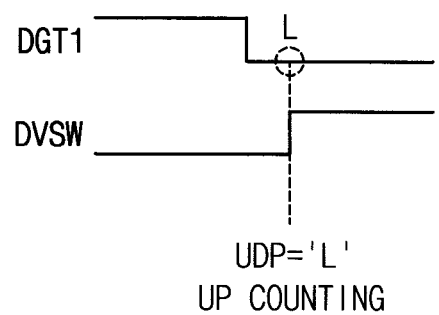
FIGS. 15, 16 and 17 are timing diagrams for describing operations of the pull-up phase counter of FIG. 14.
Figure 16:
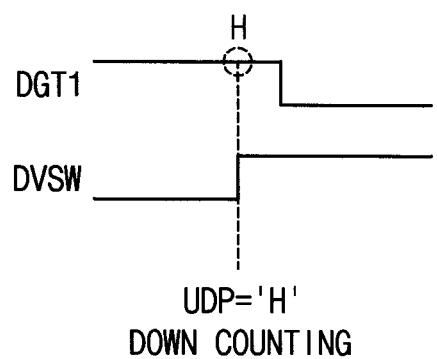
Figure 17:
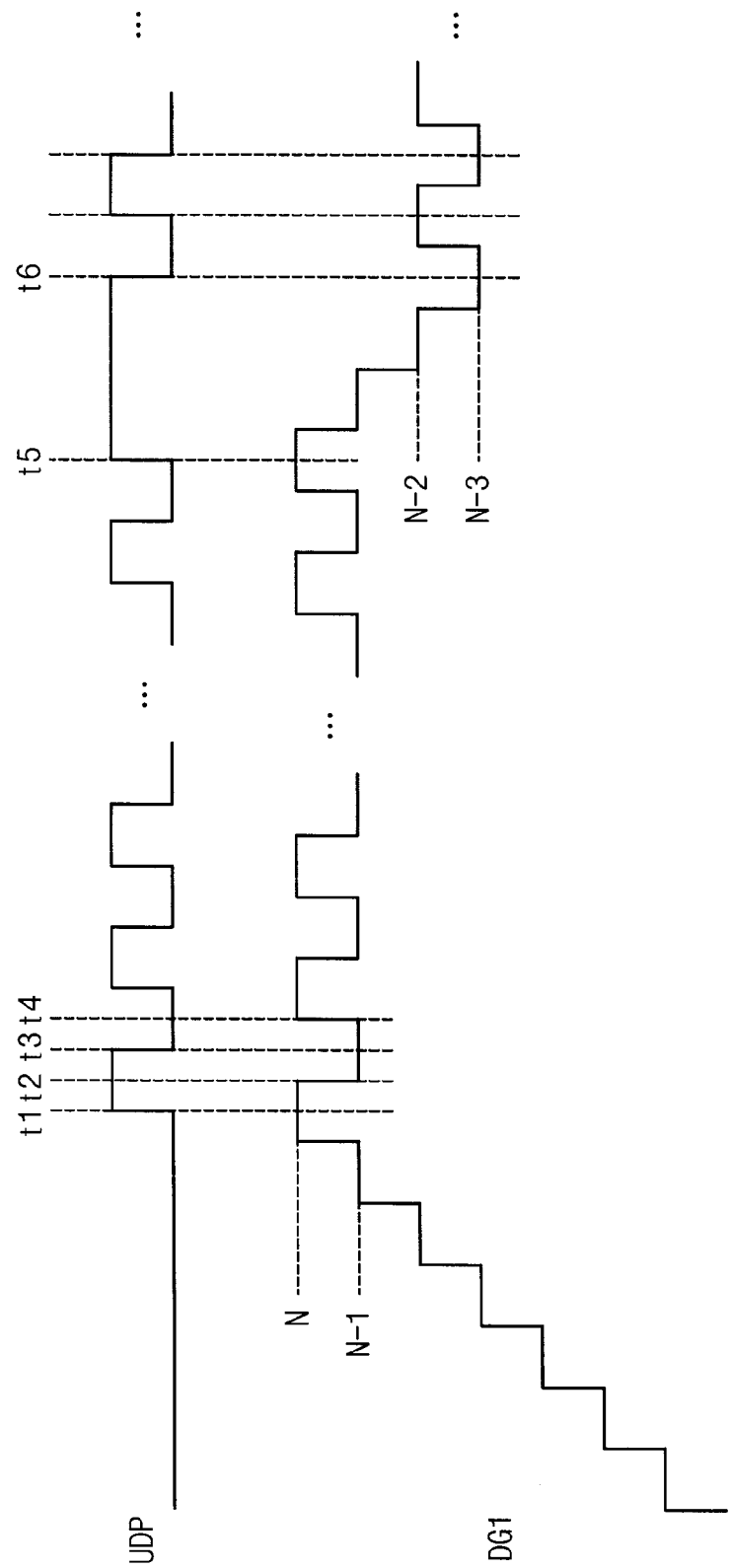

FIGS. 15, 16 and 17 are timing diagrams for describing operations of the pull-up phase counter of FIG. 14.

In at least one example embodiment, the counting control unit 413 in the pull-up phase counter 401 of FIG. 14 may include a flip-flop configured to latch the delayed pull-up gate signal DGT1 at a rising time point of the delayed switching voltage signal DVSW to generate the up-down flag signal UDP. The up-down counter 414 may selectively perform an up counting or a down counting of rising edges of the pull-up gate signal GT1 to generate the pull-up digital signal DG1.

Referring to FIGS. 14 and 15, when the rising time point of the delayed switching voltage signal DVSW is later than the falling time point of the delayed pull-up gate signal DGT1, the up-down flag signal UDP has logic low level L and the up-down counter 414 performs up-counting in response to logic low level L of the up-down flag signal UDP. The value of the pull-up digital signal DG1 increases by the up-counting and the delay amount of the pull-up delay block 412 increases. As a result, the falling time point of the delayed pull-up gate signal DGT1 may approach or lag behind the rising time point of the delayed switching voltage signal DVSW.

Referring to FIGS. 14 and 16, when the rising time point of the delayed switching voltage signal DVSW is faster than the falling time point of the delayed pull-up gate signal DGT1, the up-down flag signal UDP has logic high level H and the up-down counter 414 performs down-counting in response to logic high level H of the up-down flag signal UDP. The value of the pull-up digital signal DG1 decreases by the down-counting and the delay amount of the pull-up delay block 412 decreases. As a result, the falling time point of the delayed pull-up gate signal DGT1 may approach or precede the rising time point of the delayed switching voltage signal DVSW.

As such, through the selective up-counting or down-counting, the value of the pull-up digital signal DG1 may be maintained so that the falling time point of the delayed pull-up gate signal DGT1 approaches the rising time point of the delayed switching voltage signal DVSW.

Referring to FIG. 17, until the time point t1 while the up-down flag signal UDP maintains logic low level, the up-down counter 414 performs the up-counting and the value of the pull-up digital signal DG1 increases gradually up to N. The up-down flag signal UDP toggles during t1 through t5 and the value of the pull-up digital signal DG1 is maintained between N and N−1. Referring to FIGS. 14 and 17, the time points t1 and t3 correspond to the rising time points of the delayed switching voltage signal DVSW and the time points t2 and t4 correspond to the rising time points of the pull-up gate signal GT1.

Assuming that the operational conditions are changed at the time point t5 and the pull-up turn-on time TON1 decreases, the up-down flag signal UDP maintains logic high level. The up-down counter 414 performs the down counting during t5 through t6 and the value of the pull-up digital signal DG1 decreases gradually. The pull-up digital signal DG1 is maintained between N−2 and N−3 after the time point t6.

As such, the pull-up digital signal DG1 representing the pull-up turn-on time TON1 of the pull-up transistor TU may be provided to reflect the change of the operational conditions in real time, and in the same way, the pull-down digital signal DG2 representing the pull-down turn-on time TON2 of the pull-down transistor TD may be provided to reflect the change of the operational conditions in real time. The measurement of the turn-on times and the control of the dead time may be digitalized using the digital variable delay blocks as described with reference to FIGS. 9 and 10, and thus power efficiency and performance of a driving circuit, a voltage converter and devices including the driving circuit may be further enhanced.

Figure 18:
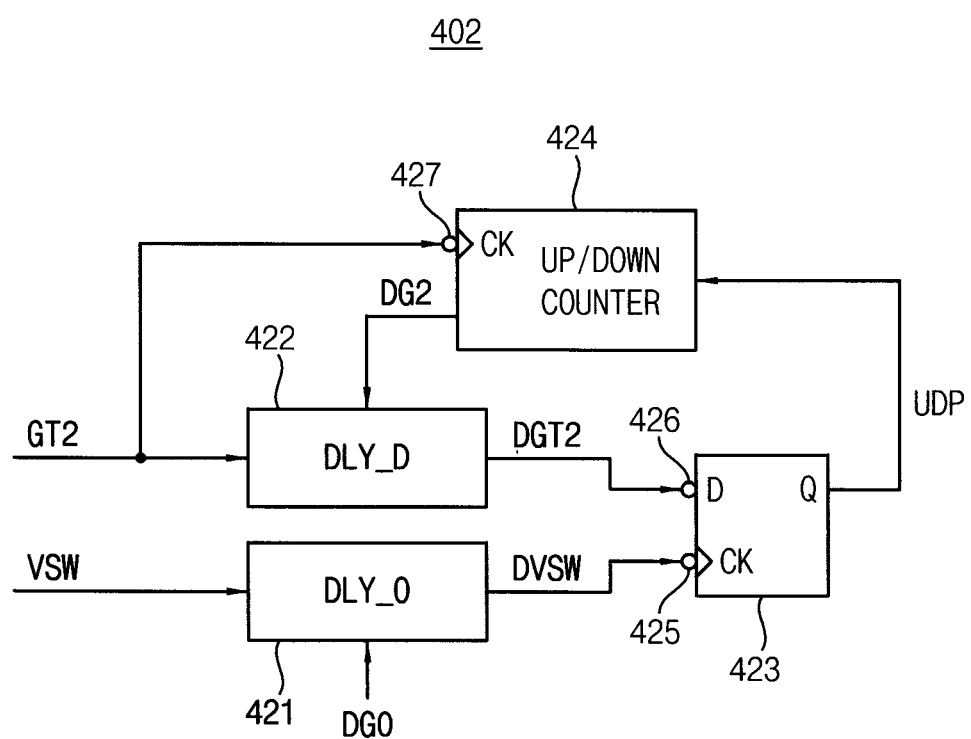
FIG. 18 is a block diagram illustrating an example embodiment of a pull-down phase counter included in the controller of FIG. 7.

FIG. 18 is a block diagram illustrating an example embodiment of a pull-down phase counter included in the controller of FIG. 7.

Referring to FIG. 18, a pull-down phase counter 402 may include an offset delay block DLY_O 421, a pull-down delay block DLY_D 422, a counting control unit 423 and an up-down counter 424.

The offset delay block 421 may delay the switching voltage signal VSW in response to a default digital signal DG0 to generate a delayed switching voltage signal DVSW. The pull-down delay block 422 may delay the pull-down gate signal GT2 in response to the pull-down digital signal DG2 to generate a delayed pull-down gate signal DGT2. The counting control unit 423 may generate an up-down flag signal UDP based on the delayed switching voltage signal DVSW and the delayed pull-down gate signal DGT2. The up-down counter 424 may generate the pull-down digital signal DG2 based on the up-down flag signal UDP and the pull-down gate signal GT2.

The offset delay block 421 and the pull-down delay block 422 may be implemented with the variable delay line as described with reference to FIGS. 9 and 10. As described above, the default digital signal DG0 provided to the offset delay block 421 may be set such that the offset delay block 421 have the minimum delay amount. In at least one example embodiment, the offset delay block 421 may be omitted and the counting control unit 423 may receive the switching voltage signal VSW (e.g., directly receive).

Figure 19:
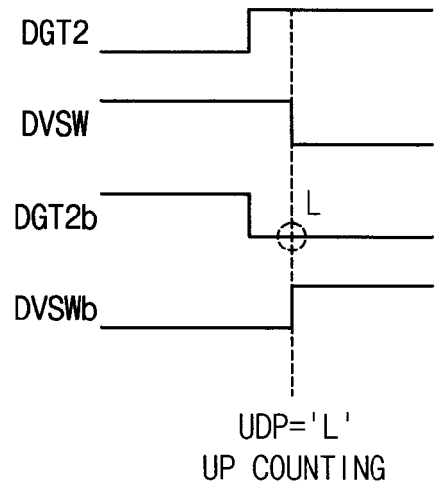
FIGS. 19 and 20 are timing diagrams for describing operations of the pull-down phase counter of FIG. 18.
Figure 20:
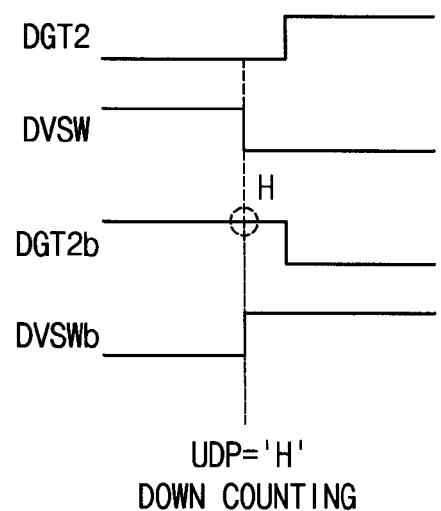

Inverters 425, 426 and 427 are illustrated in FIG. 18 so that logic levels of the signals may be compatible with an example of FIGS. 19 and 20. Such inverters 425, 426 and 427 may be disposed in front of input terminals of the counting control unit 423 and the up-down counter 424 or at arbitrary locations on signal paths. The inverters 425, 426 and 427 may be included in the counting control unit 423 and the up-down counter 424. At least one of the inverters 425, 426 and 427 may be omitted according to design of logic circuits.

FIGS. 19 and 20 are timing diagrams for describing operations of the pull-down phase counter of FIG. 18.

In at least one example embodiment, the counting control unit 423 may include a flip-flop configured to latch an inversion signal of the delayed pull-down gate signal DGT2 at a falling time point of the delayed switching voltage signal DVSW to generate the up-down flag signal UDP. The up-down counter 424 may selectively perform an up counting or a down counting of falling edges of the pull-down gate signal GT2 to generate the pull-down digital signal DG2.

Referring to FIGS. 18 and 19, when the falling time point of the delayed switching voltage signal DVSW (that is, the rising time point of the inversion signal DVSWb) is later than the rising time point of the delayed pull-down gate signal DGT2 (that is, the falling time point of the inversion signal DGT2b), the up-down flag signal UDP has logic low level L and the up-down counter 424 performs up-counting in response to logic low level L of the up-down flag signal UDP. The value of the pull-down digital signal DG2 increases by the up-counting and the delay amount of the pull-down delay block 422 increases. As a result, the rising time point of the delayed pull-down gate signal DGT2 may approach or lag behind the falling time point of the delayed switching voltage signal DVSW.

Referring to FIGS. 18 and 20, when the falling time point of the delayed switching voltage signal DVSW is faster than the rising time point of the delayed pull-down gate signal DGT2, the up-down flag signal UDP has logic low level H and the up-down counter 424 performs down-counting in response to logic high level H of the up-down flag signal UDP. The value of the pull-down digital signal DG2 decreases by the down-counting and the delay amount of the pull-down delay block 422 decreases. As a result, the rising time point of the delayed pull-down gate signal DGT2 may approach or precede the falling time point of the delayed switching voltage signal DVSW.

As such, through the selective up-counting or down-counting, the value of the pull-down digital signal DG2 may be maintained so that the rising time point of the delayed pull-down gate signal DGT2 approach the falling time point of the delayed switching voltage signal DVSW.

As described with reference to FIG. 17, the pull-down digital signal DG2 representing the pull-down turn-on time TON2 of the pull-down transistor TD may be provided to reflect the change of the operational conditions in real time. The measurement of the turn-on times and the control of the dead time may be digitalized using the digital variable delay blocks as described with reference to FIGS. 9 and 10 and thus power efficiency and performance of a driving circuit, a voltage converter and devices including the driving circuit may be further enhanced.

Figure 21:
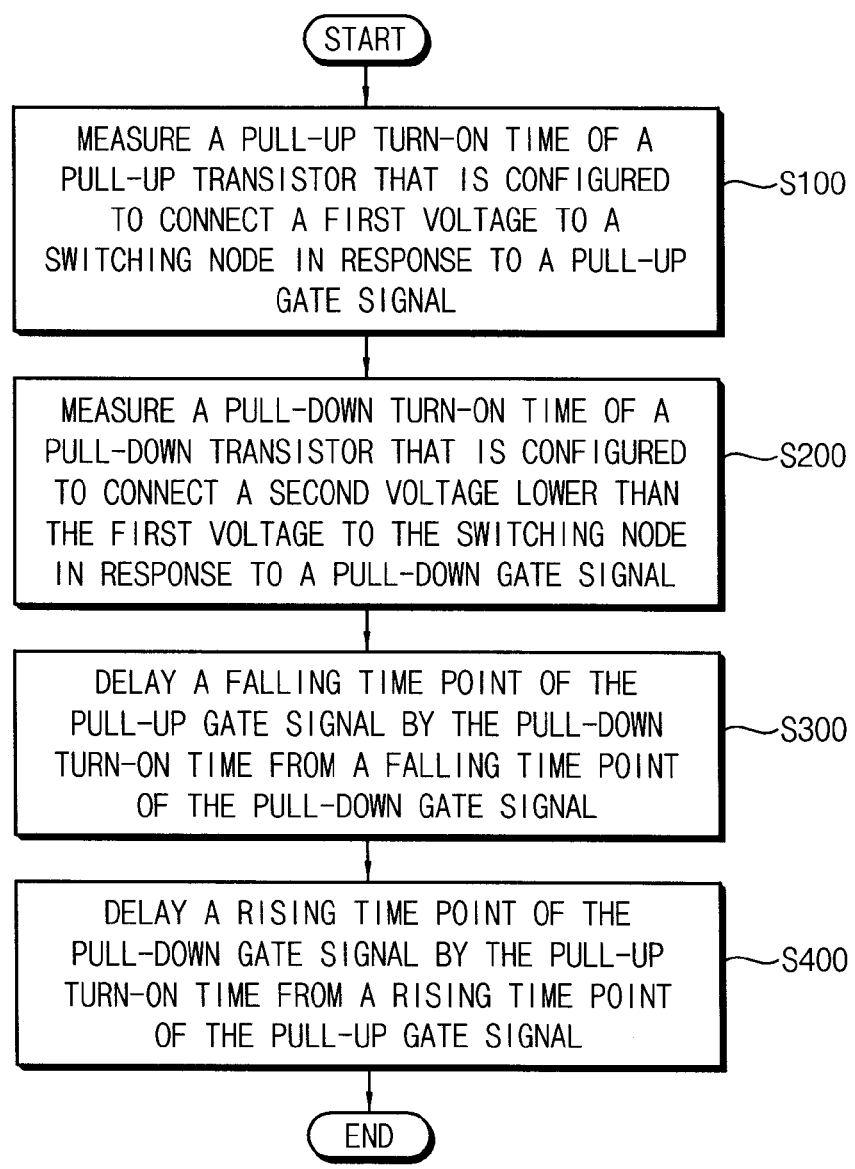
FIG. 21 is a flow chart illustrating a method of controlling a dead time according to at least one example embodiment.

FIG. 21 is a flow chart illustrating a method of controlling a dead time according to at least one example embodiment.

Referring to FIG. 21, a pull-up turn-on time TON1 of a pull-up transistor TU is measured (S100), which is configured to connect a first voltage V1 to a switching node Ns in response to a pull-up gate signal GT1. A pull-down turn-on time TON2 of a pull-down transistor TD is measured (S200), which is configured to connect a second voltage V2 lower than the first voltage V1 to the switching node Ns in response to a pull-down gate signal GT2. A falling time point of the pull-up gate signal GT1 is delayed by the pull-down turn-on time TON2 from a falling time point of the pull-down gate signal GT2 (S300). A rising time point of the pull-down gate signal GT2 is delayed by the pull-up turn-on time TON1 from a rising time point of the pull-up gate signal GT1 (S400).

As such, the dead time may be controlled adaptively by measuring the turn-on times TON1 and TON2 in real time to control the timings of the gate signals GT1 and GT2.

Figure 22:
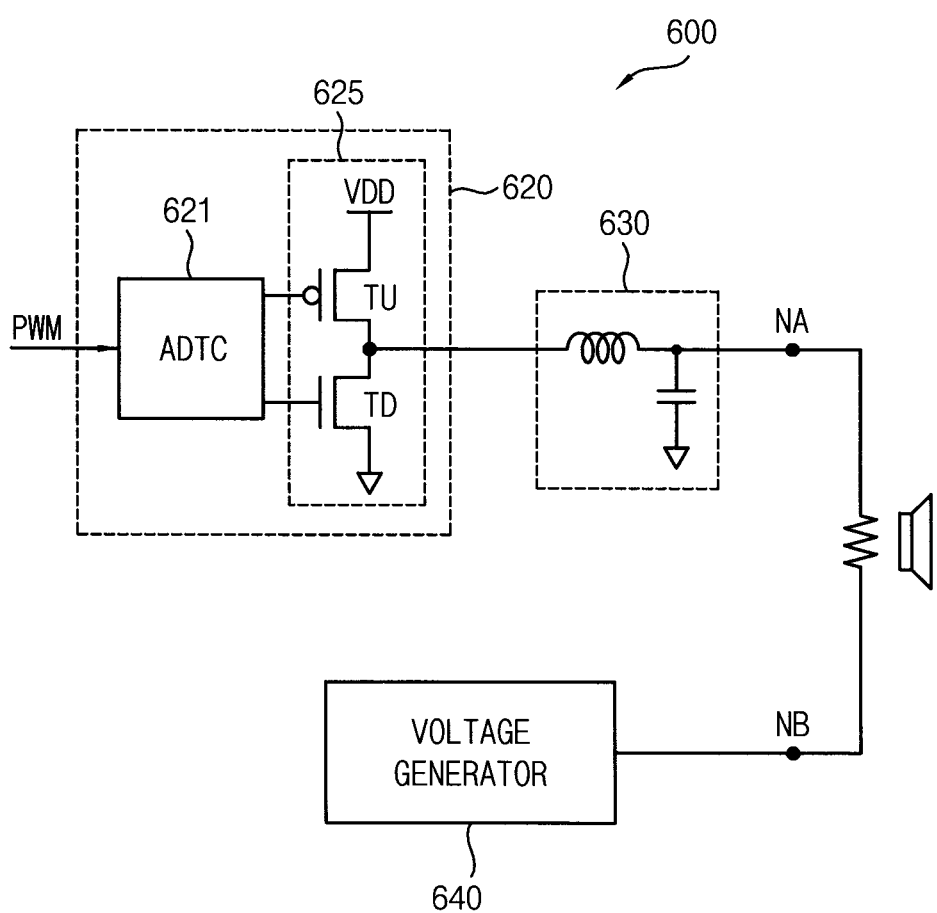
FIG. 22 is a diagram illustrating a digital amplifier adopting adaptive dead time control according to at least one example embodiment.

FIG. 22 is a diagram illustrating a digital amplifier adopting adaptive dead time control according to at least one example embodiment.

Referring to FIG. 22, a digital amplifier 600 may include a driving circuit 620, a low-pass filter 630 and a reference voltage generator 640.

The driving circuit 620 includes a controller 621 and a switching driver 625. The controller 621 may generate a pair of gate signals to control the switching operation of the switching driver 625 based on a pulse width modulation signal PWM. As described above, the controller 621 has a configuration to perform adaptive dead time control (ADTC) according to at least one example embodiment. The switching driver 625 may include a pull-up transistor TU and a pull-down transistor TD that are coupled in series between a power supply voltage VDD and a ground voltage. The transistors TD and TU may perform complementary switching operations to output a voltage signal that is amplified with full levels of the power supply voltage VDD.

The low-pass filter 630 converts the amplified voltage signal to an analog signal and output the analog signal to an output node NA. The low-pass filter 630 may average the voltage signal from the driving circuit 620 and remove high-frequency noises. As illustrated in FIG. 22, the low-pass filter 630 may be implemented with combination of an inductor and a capacitor. The reference voltage generator 640 may provide a stable reference voltage to a reference node NB using a voltage divider, an analog buffer, etc.

As described above, the adaptive dead time controller 621 may measure the turn-on times of the transistor TU and TD in real time to reflect changes of various operations conditions such as an operational voltage, an operational temperature, a manufacturing process, etc. and thus power efficiency and performance of the driving circuit 620 and the digital amplifier 600 may be enhanced.

Figure 23:
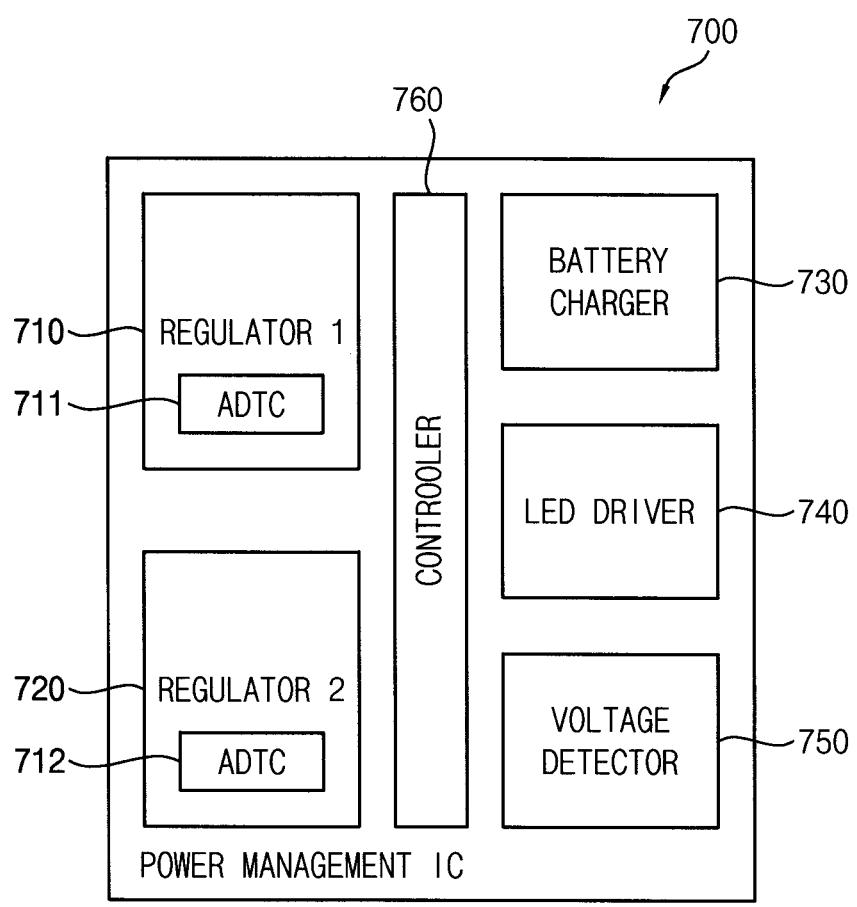
FIG. 23 is a block diagram illustrating a power management integrated circuit adopting adaptive dead time control according to at least one example embodiment.

FIG. 23 is a block diagram illustrating a power management integrated circuit adopting adaptive dead time control according to at least one example embodiment.

Referring to FIG. 23, a power management integrated circuit (IC) 700 includes at least one regulator (for example, a first regulator 710 and/or a second regulator 720). The first regulator 710 and/or the second regulator 720 may provide power to components of an electronic device (not shown) connected to the power management 700. The regulators 710 and 720 may include voltage converters 711 and 712 that perform adaptive dead time control ADTC according to at least one example embodiment.

According to an example embodiment, the power management IC 700 may include various components, for example, a battery charger 730, a light emitting diode (LED) driver 740, a voltage detector 750, or a controller 760.

The battery charger 730 may charge a battery (not shown) under control of the controller 760. The LED driver 740 may operate an LED (not shown) of the electronic device under the control of the controller 760. The voltage detector 750 is a sensor capable of detecting a voltage of the electronic device. The controller 760 may further control an operation of the first and second regulators 710 and 720.

Through the ADTC, the dead time may be controlled adaptively by reflecting various operational conditions such as an operational voltage, an operational temperature, a manufacturing process, etc. and thus power efficiency and performance of the power management IC 700, and devices and/or systems that are powered by the power management IC 700 may be enhanced.

Figure 24:
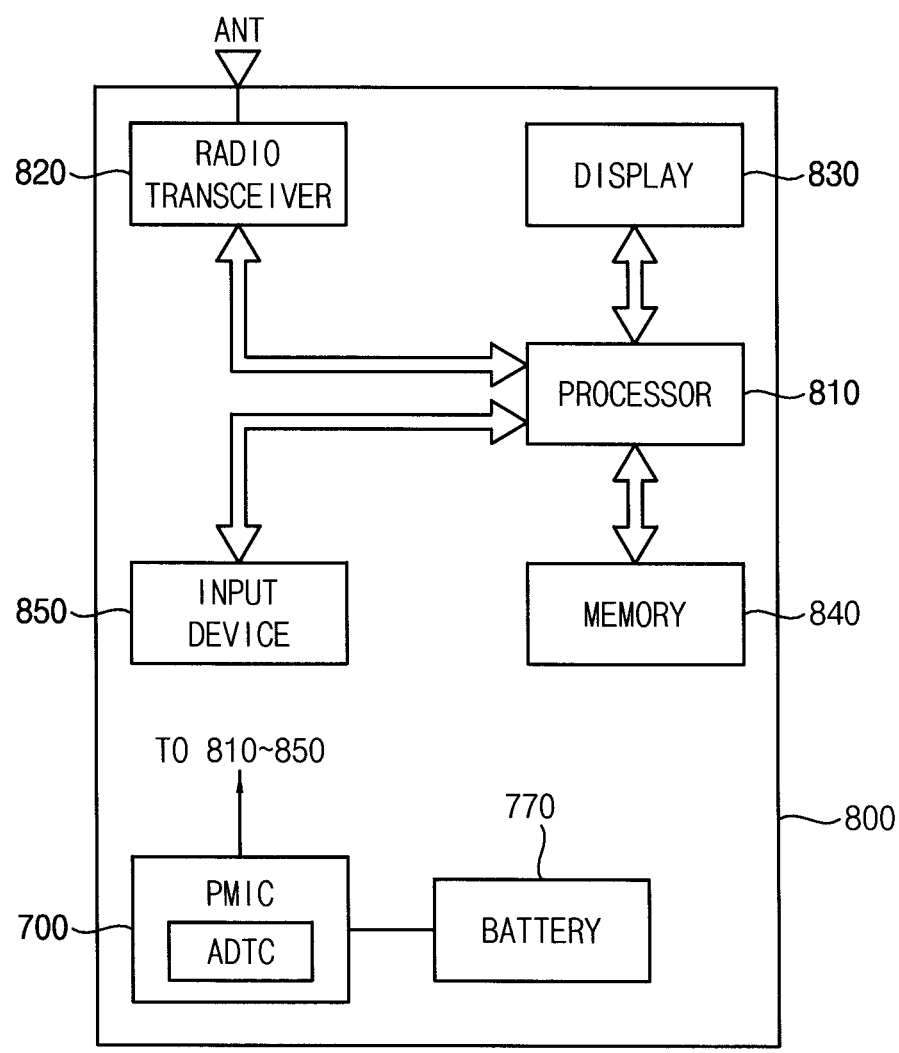
FIG. 24 is a block diagram illustrating an electronic device adopting adaptive dead time control according to at least one example embodiment.

FIG. 24 is a block diagram illustrating an electronic device adopting adaptive dead time control according to at least one example embodiment.

Referring to FIG. 24, an electronic device 800, for example, a cellular phone, a smart phone, or a tablet personal computer (PC), includes a power management integrated circuit (PMIC) 700 and a battery 770.

The PMIC 700 is provided with power from the battery 770 and the PMIC 700 is configured to manage power of a processor 810, a wireless transmitter-receiver 820, a display 830, a memory 840, or an input device 850. The PMIC 700 includes a voltage converter ADTC configured to perform adaptive dead time control according to at least one example embodiment.

The wireless transmitter-receiver 820 may transmit or receive a radio signal through an antenna ANT. For example, the wireless transmitter-receiver 820 may convert the radio signal received through the antenna ANT into a signal to be processed by the processor 810. Accordingly, the processor 810 may process the signal output from the wireless transmitter-receiver 820 and store the processed signal to the memory 840 or display the processed signal through the display 830.

The wireless transmitter-receiver 820 may convert the signal output from the processor 810 into a radio signal and output the converted radio signal to the outside through the antenna ANT. The input device 850 is a device capable of receiving an input for a control signal for controlling an operation of the processor 810 or a data to be processed by the processor 810, and may be implemented as, for example, a pointing device such as a touch pad, a computer mouse, a key pad, or a key board.

The processor 810 may control the display 830 to display a data output from the memory 840, a radio signal output from the wireless transmitter-receiver 820, or a data output from the input device 850.

Through the ADTC, the dead time may be controlled adaptively by reflecting various operational conditions such as an operational voltage, an operational temperature, a manufacturing process, etc. and thus power efficiency and performance of the PMIC 700 and electronic device 800 that is powered by the PMIC 700 may be enhanced.

Figure 25:
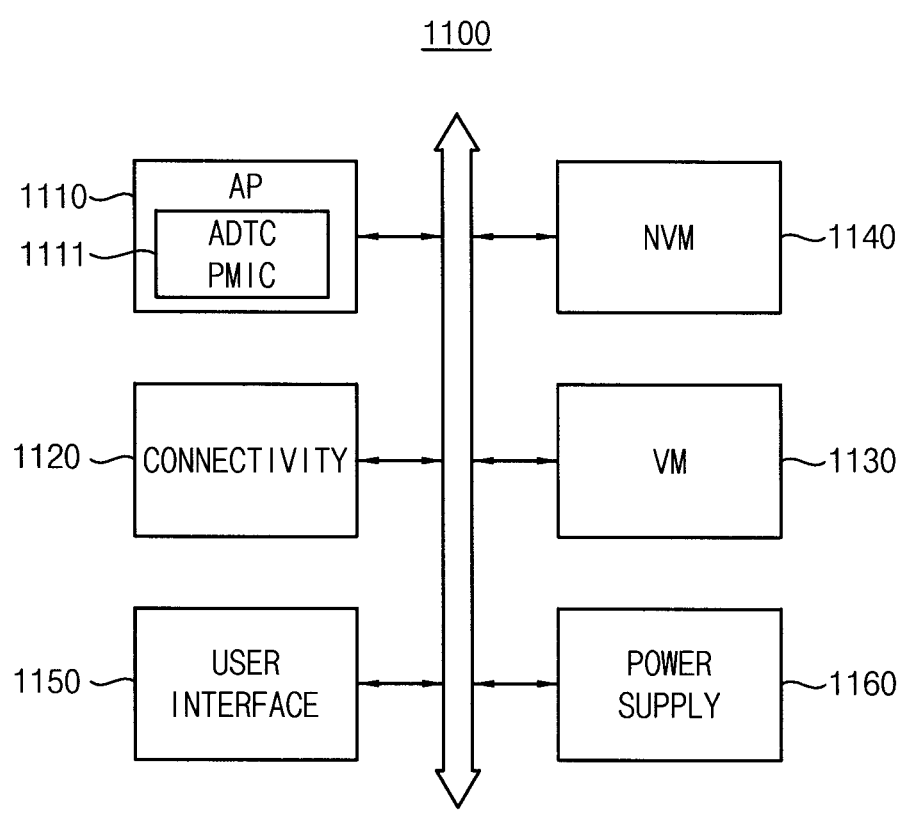
FIG. 25 is a block diagram illustrating a mobile system adopting adaptive dead time control according to at least one example embodiment.

FIG. 25 is a block diagram illustrating a mobile system adopting adaptive dead time control according to at least one example embodiment.

Referring to FIG. 25, a mobile system 1100 includes an application processor (AP) 1110, a connectivity unit 1120, a volatile memory (VM) device 1130, a nonvolatile memory (NVM) device 1140, a user interface 1150 and a power supply 1160. According to at least one example embodiment, the mobile system 1100 may be any mobile system, such as a mobile phone, a smart phone, a personal digital assistant (PDA), a portable multimedia player (PMP), a digital camera, a portable game console, a music player, a camcorder, a video player, a navigation system, etc.

The application processor 1110 may execute applications, such as a web browser, a game application, a video player, etc. According to at least one example embodiment, the application processor 1110 may be coupled to an internal and/or external cache memory.

The application processor 1110 may include a power management integrated circuit (PMIC) 1111. The PMIC may have a configuration to perform adaptive dead time control (ADTC) according to at least one example embodiment.

The connectivity unit 1120 may perform wired or wireless communication with an external device (not shown). For example, the connectivity unit 1120 may perform Ethernet communication, near field communication (NFC), radio frequency identification (RFID) communication, mobile telecommunication, memory card communication, universal serial bus (USB) communication, etc.

The volatile memory device 1130 may store data processed by the application processor 1110, or may operate as a working memory. For example, the volatile memory device 1130 may be a dynamic random access memory (DRAM), a static random access memory (SRAM), a mobile DRAM, etc.

The nonvolatile memory device 1140 may store a boot image for booting the mobile system 1100. For example, the nonvolatile memory device 1140 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The user interface 1150 may include at least one input device, such as a keypad, a touch screen, etc., and at least one output device, such as a speaker, a display device, etc. The power supply 1160 may supply a power supply voltage to the mobile system 1100. In at least one example embodiment, the mobile system 1100 may further include a camera image processor (CIS), and/or a storage device, such as a memory card, a solid state drive (SSD), a hard disk drive (HDD), a CD-ROM, etc.

In at least one example embodiment, the mobile system 1100 and/or components of the mobile system 1100 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi-chip package (MCP), wafer-level fabricated package (WFP), or wafer-level processed stack package (WSP).

Through the ADTC, the dead time may be controlled adaptively by reflecting various operational conditions such as an operational voltage, an operational temperature, a manufacturing process, etc. and thus power efficiency and performance of the PMIC 1111, the application processor 1110 and the mobile system 1100 may be enhanced.

Figure 26:
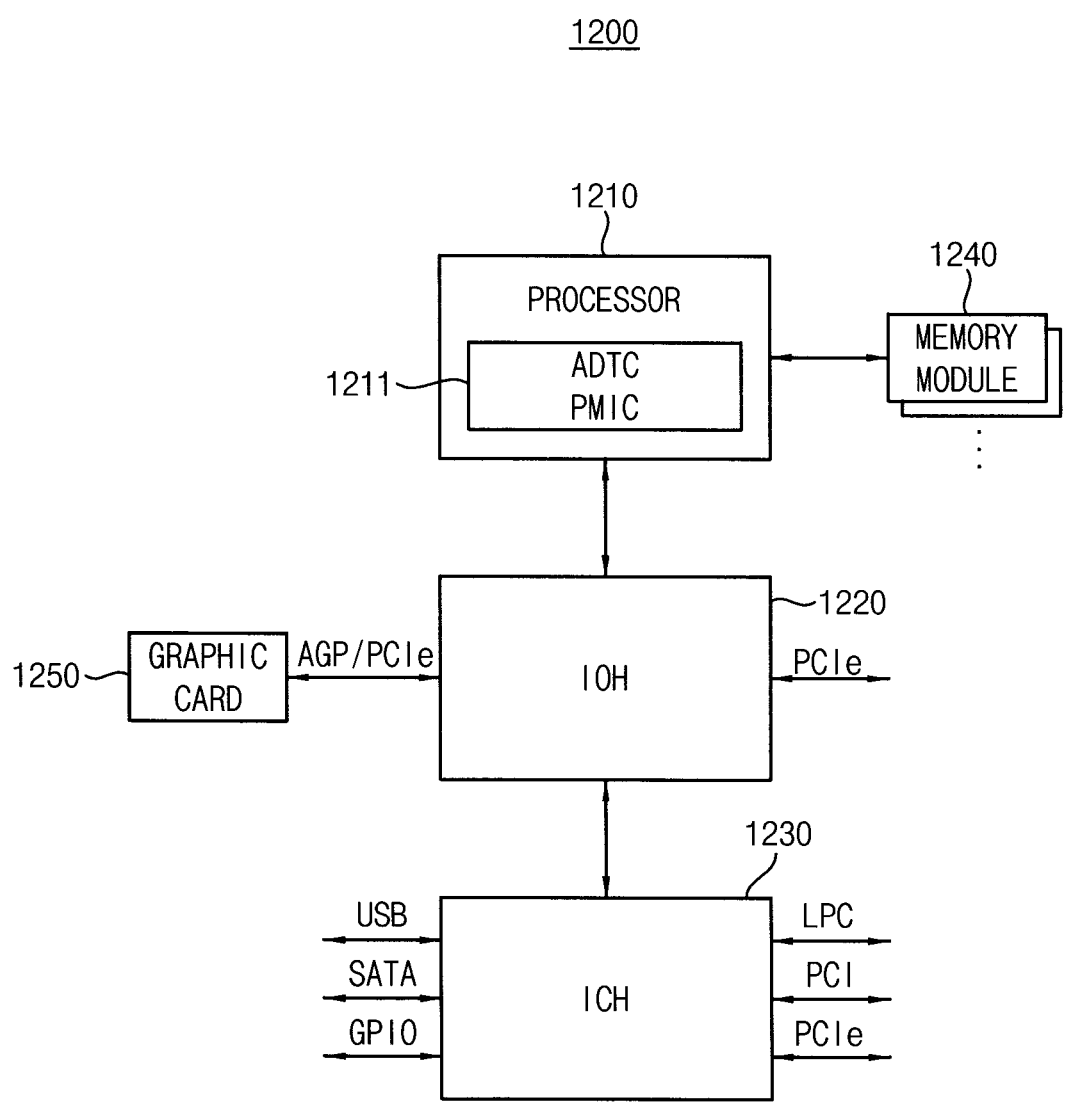
FIG. 26 is a block diagram illustrating a computing system adopting adaptive dead time control according to at least one example embodiment.

FIG. 26 is a block diagram illustrating a computing system adopting adaptive dead time control according to at least one example embodiment.

Referring to FIG. 26, a computing system 1200 includes a processor 1210, an input/output hub (IOH) 1220, an input/output controller hub (ICH) 1230, at least one memory module 1240 and a graphics card 1250. In at least one example embodiment, the computing system 1200 may be a personal computer (PC), a server computer, a workstation, a laptop computer, a mobile phone, a smart phone, a personal digital assistant (PDA), a portable multimedia player (PMP), a digital camera, a digital television, a set-top box, a music player, a portable game console, a navigation system, etc.

The processor 1210 may perform various computing functions, such as executing specific software for performing specific calculations or tasks. For example, the processor 1210 may be a microprocessor, a central process unit (CPU), a digital signal processor, or the like. The processor 1210 may include a power management integrated circuit (PMIC) 1211. The PMIC 1211 may have a configuration to perform adaptive dead time control (ADTC) according to at least one example embodiment.

In at least one example embodiment, the processor 1210 may include a single core or multiple cores. For example, the processor 1210 may be a multi-core processor, such as a dual-core processor, a quad-core processor, a hexa-core processor, etc. Although FIG. 21 illustrates the computing system 1200 including one processor 1210, in at least one example embodiment, the computing system 1200 may include a plurality of processors. The processor 1210 may include an internal or external cache memory.

The processor 1210 may include a memory controller (not shown) for controlling operations of the memory module 1240. The memory controller included in the processor 1210 may be referred to as an integrated memory controller (IMC). The memory controller may include a structure and/or perform methods of one or more of the example embodiments described herein. A memory interface (not shown) between the memory controller and the memory module 1240 may be implemented with a single channel including a plurality of signal lines, or may bay be implemented with multiple channels, to each of which at least one memory module 1240 may be coupled. In at least one example embodiment, the memory controller may be located inside the input/output hub 1220, which may be referred to as a memory controller hub (MCH).

The input/output hub 1220 may manage data transfer between the processor 1210 and devices, such as the graphics card 1250. The input/output hub 1220 may be coupled to the processor 1210 via various interfaces (not shown). For example, the interface between the processor 1210 and the input/output hub 1220 may be a front side bus (FSB), a system bus, a HyperTransport, a lightning data transport (LDT), a QuickPath interconnect (QPI), a common system interface (CSI), etc. Although FIG. 21 illustrates the computing system 1200 including one input/output hub 1220, in at least one example embodiment, the computing system 1200 may include a plurality of input/output hubs. The input/output hub 1220 may provide various interfaces with the devices. For example, the input/output hub 1220 may provide an accelerated graphics port (AGP) interface, a peripheral component interface-express (PCIe), a communications streaming architecture (CSA) interface, etc.

The graphics card 1250 may be coupled to the input/output hub 1220 via the AGP or the PCIe. The graphics card 1250 may control a display device (not shown) for displaying an image. The graphics card 1250 may include an internal processor (not shown) for processing an image data and an internal memory device (not shown). In at least one example embodiment, the input/output hub 1220 may include an internal graphics device (not shown) along with or instead of the graphics card 1250. The graphics device included in the input/output hub 1220 may be referred to as integrated graphics. Further, the input/output hub 1220 including the internal memory controller and the internal graphics device may be referred to as a graphics and memory controller hub (GMCH).

The input/output controller hub 1230 may perform data buffering and interface arbitration to efficiently operate various system interfaces. The input/output controller hub 1230 may be coupled to the input/output hub 1220 via an internal bus, such as a direct media interface (DMI), a hub interface, an enterprise Southbridge interface (ESI), PCIe, etc. The input/output controller hub 1230 may provide various interfaces with peripheral devices. For example, the input/output controller hub 1230 may provide a universal serial bus (USB) port, a serial advanced technology attachment (SATA) port, a general purpose input/output (GPIO), a low pin count (LPC) bus, a serial peripheral interface (SPI), PCI, PCIe, etc.

In at least one example embodiment, the processor 1210, the input/output hub 1220 and the input/output controller hub 1230 may be implemented as separate chipsets or separate integrated circuits. In at least one other example embodiment, at least two among the processor 1210, the input/output hub 1220 and the input/output controller hub 1230 may be implemented as a single chipset.

Through the ADTC, the dead time may be controlled adaptively by reflecting various operational conditions such as an operational voltage, an operational temperature, a manufacturing process, etc. and thus power efficiency and performance of the PMIC 1211, the processor 1210 and the computing system 1200 may be enhanced.

The above described example embodiments may be applied to an arbitrary electronic device or system that requires dead time control. For example, the example embodiments may be applied to electronic devices such as a memory card, a solid stage drive (SSD) a computer, a laptop, a digital camera, a cellular phone, a smart-phone, a smart-pad, a personal digital assistants (PDA), a portable multimedia player (PMP), an MP3 player, a navigation system, a video camcorder, a portable game console, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of inventive concepts. Accordingly, all such modifications are intended to be included within the scope of inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A voltage converter comprising: a switching driver including a pull-up switching circuit and a pull-down switching circuit, the pull-up switching circuit being configured to connect an input voltage to a switching node in response to a pull-up signal, the pull-down switching circuit being configured to connect a ground voltage to the switching node in response to a pull-down signal; a controller configured to generate the pull-up signal and the pull-down signal in response to a pulse width modulation signal and configured to measure a pull-up turn-on time of the pull-up switching circuit and a pull-down turn-on time of the pull-down switching circuit to control a dead time, the dead time being a time during which both of the pull-up switching circuit and the pull-down switching circuit are turned off; a low-pass filter configured to filter a switching voltage signal on the switching node to generate an output voltage; and a pulse width modulation signal generator configured to generate the pulse width modulation signal based on a reference signal and the output voltage, wherein the controller includes: a detector configured to generate a pull-up digital signal and a pull-down digital signal based on the switching voltage signal, the null-un signal, and the null-down signal, wherein the pull-un digital signal represents the null-un turn-on time and the null-down digital signal represents the null-down turn-on time, a signal generator configured to generate the pull-up signal and the pull-down signal based on the pulse width modulation signal, the pull-up digital signal, and the pull-down digital signal, such that the pull-up signal and the pull-down signal have the dead time corresponding to the pull-up turn-on time and the pull-down turn-on time.

2. The voltage converter of claim 1, wherein the controller is configured to:
    delay a falling time point of the pull-up signal by the pull-down turn-on time from a falling time point of the pull-down signal; and
    delay a rising time point of the pull-down signal by the pull-up turn-on time from a rising time point of the pull-up signal.

3. The voltage converter of claim 1, wherein the controller is configured to measure the pull-up turn-on time and the pull-down turn-on time by comparing phases of the switching voltage signal, the pull-up signal and the pull-down signal.

4. The voltage converter of claim 1, wherein the controller is configured to:
    measure a difference between a falling time point of the pull-up signal and a rising time point of the switching voltage signal as the pull-up turn-on time; and
    measure a difference between a rising time point of the pull-down signal and a falling time point of the switching voltage signal as the pull-down turn-on time.

5. The voltage converter of claim 1, wherein the detector includes: a pull-up phase counter configured to compare a phase of the pull-up signal and a phase of the switching voltage signal to generate the pull-up digital signal; and a pull-down phase counter configured to compare a phase of the pull-down signal and the phase of the switching voltage signal to generate the pull-down digital signal.

6. The voltage converter of claim 5, wherein the pull-up phase counter includes:
    an offset delay block configured to delay the switching voltage signal in response to a default digital signal to generate a delayed switching voltage signal;
    a pull-up delay block configured to delay the pull-up signal in response to the pull-up digital signal to generate a delayed pull-up signal;
    a counting control unit configured to generate an up-down flag signal based on the delayed switching voltage signal and the delayed pull-up signal; and
    an up-down counter configured to generate the pull-up digital signal based on the up-down flag signal and the pull-up signal.

7. The voltage converter of claim 6, wherein the counting control unit includes:

a flip-flop configured to latch the delayed pull-up signal at a rising time point of the delayed switching voltage signal to generate the up-down flag signal.

8. The voltage converter of claim 7, wherein the up-down counter is configured to selectively perform an up counting or a down counting of rising edges of the pull-up signal to generate the pull-up digital signal.

9. The voltage converter of claim 5, wherein the pull-down phase counter includes:
an offset delay block configured to delay the switching voltage signal in response to a default digital signal to generate a delayed switching voltage signal;
a pull-down delay block configured to delay the pull-down signal in response to the pull-down digital signal to generate a delayed pull-down signal;
a counting control unit configured to generate an up-down flag signal based on the delayed switching voltage signal and the delayed pull-down signal; and
an up-down counter configured to generate the pull-down digital signal based on the up-down flag signal and the pull-down signal.

10. The voltage converter of claim 9, wherein the counting control unit includes:
a flip-flop configured to latch an inversion signal of the delayed pull-down signal at a falling time point of the delayed switching voltage signal to generate the up-down flag signal.

11. The voltage converter of claim 10, wherein the up-down counter is configured to selectively perform an up counting or a down counting of falling edges of the pull-down signal to generate the pull-down digital signal.

12. The voltage converter of claim 1, wherein the signal generator includes: an offset delay block configured to delay the pulse width modulation signal in response to a default digital signal to generate a delayed offset signal; a pull-up delay block configured to delay the pulse width modulation signal in response to the pull-down digital signal to generate a delayed pull-up signal; a pull-down delay block configured to delay the pulse width modulation signal in response to the pull-up digital signal to generate a delayed pull-down signal; a first logic gate configured to perform an OR logic operation on the delayed offset signal and the delayed pull-up signal to generate the pull-up signal; and a second logic gate configured to perform an AND logic operation on the delayed offset signal and the delayed pull-down signal to generate the pull-down signal.

13. The voltage converter of claim 12, wherein the offset delay block, the pull-up delay block and the pull-down delay block have same configurations and the default digital signal is set to a value such that the offset delay block has a minimum delay amount.

14. The voltage converter of claim 12, wherein each of the offset delay block, the pull-up delay block and the pull-down delay block has a plurality of delay units that are coupled in series, and each of the plurality of delay units has a delay amount that is varied in response to each bit of a digital signal.

15. The voltage converter of claim 1, wherein the signal generator includes: a pull-up delay block configured to delay the pulse width modulation signal in response to the pull-down digital signal to generate a delayed pull-up signal; a pull-down delay block configured to delay the pulse width modulation signal in response to the pull-up digital signal to generate a delayed pull-down signal; a first logic gate configured to perform an OR logic operation on the pulse width modulation signal and the delayed pull-up signal to generate the pull-up signal; and a second logic gate configured to perform an AND logic operation on the pulse width modulation signal and the delayed pull-down signal to generate the pull-down signal.

* * * * *